United States Patent
Burbridge et al.

(10) Patent No.: US 6,868,370 B1
(45) Date of Patent: Mar. 15, 2005

(54) METHODS AND APPARATUS FOR SYSTEM AND DEVICE DESIGN

(75) Inventors: David Burbridge, Fairview Heights, IL (US); Barry Garofalo, Bridgeton, MO (US); Jeff Steffen, Phoenix, AZ (US); John Woolner, Troy, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/574,564

(22) Filed: May 17, 2000

Related U.S. Application Data

(60) Provisional application No. 60/134,450, filed on May 17, 1999.

(51) Int. Cl.[7] ................................................. G06F 17/11
(52) U.S. Cl. .............................. 703/1; 703/22; 706/46
(58) Field of Search ...................... 703/1, 22; 709/101, 709/102, 202; 700/83, 286; 706/46; 345/441; 702/184; 707/102

(56) References Cited

U.S. PATENT DOCUMENTS

| | | | |
|---|---|---|---|
| 4,862,345 A | 8/1989 | Lekron | |
| 5,557,556 A | 9/1996 | Shank, Jr. | |
| 5,666,297 A | 9/1997 | Britt et al. | |
| 5,930,762 A | * | 7/1999 | Masch ........................... 705/7 |
| 6,226,620 B1 | * | 5/2001 | Oon ............................. 705/2 |
| 6,519,601 B1 | * | 2/2003 | Bosch ......................... 707/100 |

OTHER PUBLICATIONS

William Paseman, "Architecture of an Integration and Portability Platform," IEEE, 1998, pp. 254–258.*

Zirkelbach et al, "Databases in Automated Process Control," IEEE, 1998, pp. 193–198.*

Uehara et al., "Enterprise Model–based Software Architecture with Server Component Integration," IEEE, 1998, pp. 356–363.*

* cited by examiner

*Primary Examiner*—Thai Phan
(74) *Attorney, Agent, or Firm*—Armstrong Teasdale LLP

(57) ABSTRACT

A system includes a database stored on a server utilized for collecting information throughout a plant and/or component design process. The system provides access to engineering data for all parties simultaneously, even if team members are in different parts of the world and allows changes and/or corrections to engineering documents through remote access. The system also is robust enough to handle large volumes of documents and users.

31 Claims, 20 Drawing Sheets

Industrial Systems

| Home | Industrial Home | Unity Home |

Welcome to Project Unity

What is Project Unity

Project Unity is a set of cohesive integration services that provide web-based project management tools and information in a secure, open format which can be shared at all levels within and outside of any organization.

Project Unity is NOT a product that only offers a fixed number of rigid tools that force a customer to conform to a new set of standards.

Visit the
Business Site

52 — Project Unity Login
54 — About Project Unity
56 — Contact Us

TOTAL SYSTEM SOLUTIONS RESOURCES

▽ Feedback

- WebMaster (E-Mail)

Industrial Systems

Complete Process Control
and Automation Solutions

| | | | | | | |
|---|---|---|---|---|---|---|
| Home | Industrial Home | Unity Home | Project Home | Project Team | Contacts | |

Visit the
Business Site

New Issues
Update Issues

Industrial Systems

Filter By: My Issues ▽   Sort By: Status ▽

| | Status | Issue Date | Issue # | Description | Target Date | Responsible |
|---|---|---|---|---|---|---|
| — | New | 2/21/00 | #9901 | The printer in the CAD room | 3/10/00 | David |
| — | Active | 2/1/00 | #9900 | The account number for this project | 2/10/00 | Ray |

▽ QUICK SEARCH

Ask a Question/Keyword
[        ] Go

Industrial Systems

Complete Process Control
and Automation Solutions

FIG. 10

Industrial Systems

| Home | Industrial Home | Unity Home | Project Home | Project Team | Contacts |

Visit the
Business Site

| Date | Name | Article |
| --- | --- | --- |
| 2/18/00 | Exciting New Look | NOTICE!!! There have been major changes to the Project Schedule and various other areas. Please review the schedule as well as the other areas at your earliest convenience. |
| 01/29/00 | Travelers | Team Members traveling should be reminded not to bring valuable items across the border. Items have been confiscated and not seen again. |
| 01/01/00 | Project Unity | Welcome to Project Unity. Please familiarize yourself with all the options available to you. |

Industrial Systems

Complete Process Control
and Automation Solutions

METHODS AND APPARATUS FOR SYSTEM AND DEVICE DESIGN

CROSS REFERENCE TO RELATED APPLICATIONS

This application claims the benefit of U.S. Provisional Application No. 60/134,450, filed May 17, 1999.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to a system for the design of systems and devices, and more particularly, to a network based system (e.g., the Internet) that enables distributed system and device design.

A plant or company life cycle (e.g., the life cycle of a plant that produces concrete) starts with a need or an opportunity and moves to concept/scope, pre-engineering, detailed engineering, construction, startup/commissioning, and then back to needs and opportunities. Information is gathered at each of these phases.

Throughout these phases, information is gathered and stored for later use. The information is typically maintained in different formats such as fixed printed images on paper or fixed in other media forms such as tapes, diskettes, cartridges, laser disk or compact disk. The Internet and intranets provide some accessibility to the data but problems arise on the networks such as security clearance, knowing the exact location of the data, or having the correct software to view the information. Unfortunately, the information is sometimes stored at multiple locations on the network. Having the same information stored at multiple locations on the network creates version control problems. Since changes to the information does not always occur at all the locations, version control becomes difficult, and perhaps even nonexistent.

BRIEF SUMMARY OF THE INVENTION

In an exemplary embodiment, a project management integration system includes a database stored on a server utilized for collecting information throughout a plant and/or company design process. The system provides access to engineering data for all parties simultaneously, even if those parties are in different parts of the world, allows changes and/or corrections to engineering documents though remote access, and is robust enough to handle large volumes of documents and users.

The system includes a front-end application that provides project information to a user and a database for storing and maintaining the information that pertains to the project. The project information is integrated from external systems into the database for display through a web interface. The project management system allows project team members to view project information and perform project administration activities. As well, the project management component provides functionality to project managers and project administrators for editing information about the project. The database stores information in a single, comprehensive data location regardless of how the information was obtained or from where the information was obtained.

Specifically, the project management component includes tools for both the management of the design project and the actual design of a particular plant/company. The management tools include project documents containing the project schedule, a phone list, an organization chart, an executive summary, meeting minutes, and progress reports. The design tools include drawing software which enables drawings, and redline drawings, to be created, and an instrument index which tracks, for example, all equipment in a plant and information related to such equipment.

BRIEF DESCRIPTION OF THE DRAWINGS

FIG. 3 is an exemplary home page utilized to access the system shown in FIG. 1;

FIG. 10 is an exemplary project issues page;

FIG. 15 is an exemplary Project News and Project Safety Tips page;

DETAILED DESCRIPTION OF THE INVENTION

Figure 1:
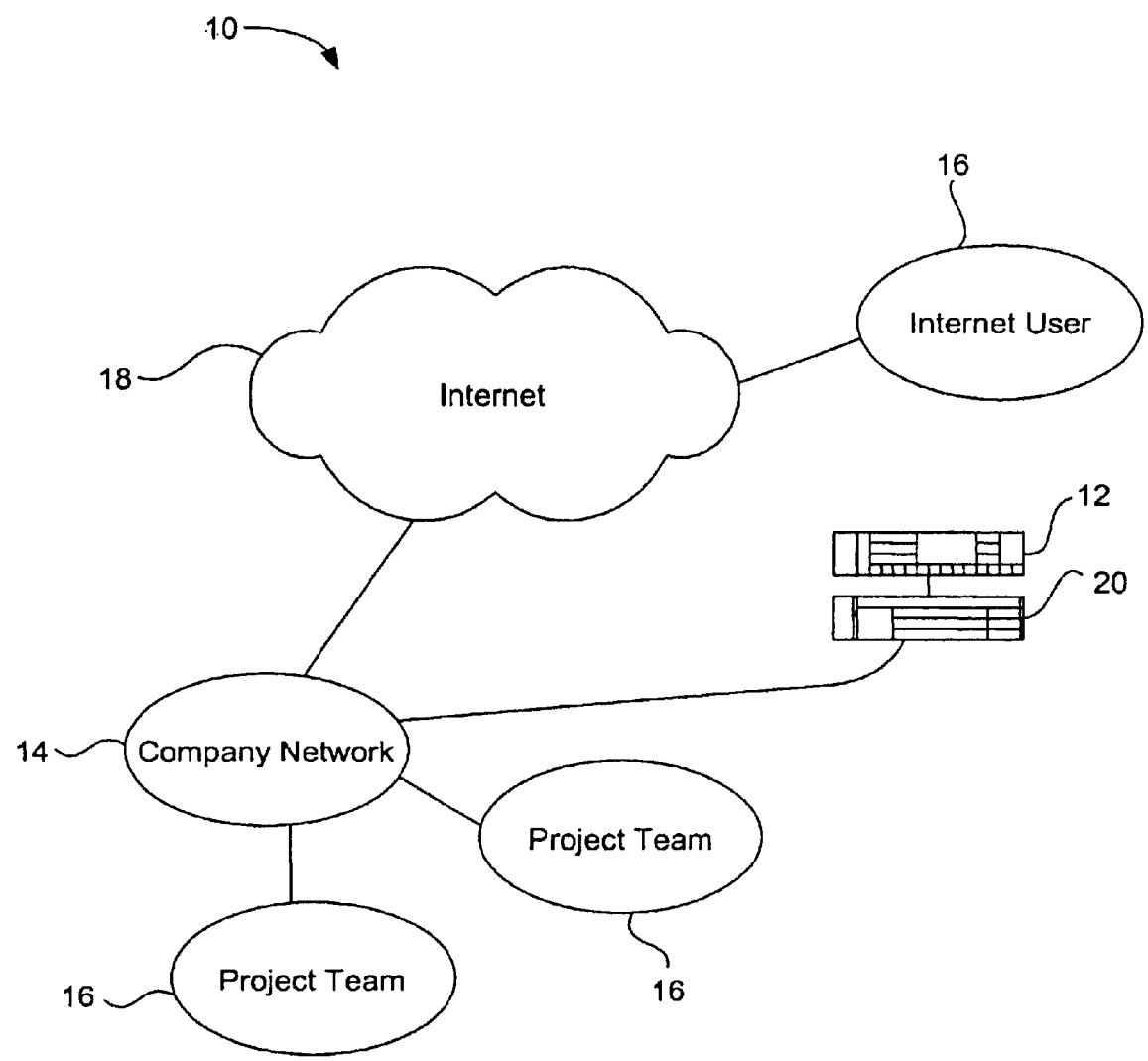
FIG. 1 is a system diagram of a network architecture in accordance with one embodiment of the present invention.

Generally, and in accordance with one embodiment of the present invention, all data related to the design and operation of a plant, including equipment used within the plant, is accessible from a centralized database. When a designer or an operator wants to look up a certain topic, the operator simply clicks on the subject and the system identifies locations where the information can be found. The database also is accessible by the control system, plant information systems and also through a project web page so the information can be accessed through the World Wide Web.

In addition, and to provide an environment capable of having additional functionality, e.g., addition of software packages, bolted onto the system, all software packages utilized are selected based on satisfying certain standards. In an exemplary embodiment, these standards include: ODBC compliant, TCPIP protocol, object-oriented programming and Active X. Utilizing software packages which meet certain criteria facilitates interfacing the software packages together. For example, if one specific software package meets this criterion, the package can be used in the system. This allows a bolted on system rather than a welded together system.

Further, from the concept scope phase through pre-engineering, and starting into detailed engineering, intelligent drawings and an instrument index are utilized. Intelligent drawings refers to drawings that are object oriented. Therefore, multiple "what if" scenarios can be run, and determinations can be made based on the cost and meeting the objectives of the project through these scenarios. An instrument index is a data base that maintains a record of every piece of equipment located in the plant, and is used to track the life of that piece of equipment through engineering, procurement, installation, startup and maintenance.

From detailed engineering to plant construction, packages such as a software simulation package for the PLC and the HMI are used. An equipment factory acceptance test and also the instrument index are used to determine whether proper checkout has been accomplished with these pieces of equipment.

The information gathered through all these phases goes in the database. In going from plant construction, through plant operation and maintenance, the intelligent drawings and the instrument index continue to be utilized. For maintenance, a maintenance system is utilized. The maintenance system tracks when a piece of equipment in the plant needs to be serviced, and utilizes the run time information that has been gathered through the previous phases. The database information is used to run the plant.

As the plant is operated, new needs and opportunities are assessed in reviewing, for example, packages such as a data historian, plant paging, and the HMI. The engineering and the information that is gathered from every phase of the project is utilized to facilitate making proper decisions on operating and maintaining the plant and then looking for the needs and opportunities to improve the plant.

Two benefits to this approach are spare part reduction and quality control. Cross matches for spare parts are obtained and then analyzed to reduce spare parts requirements. In addition, each factory acceptance test, each software point, each continuity test, and each device check out is recorded and verified. The database therefore is used to ensure everything is checked out to completeness. These four checkout steps eliminate surprises at startup.

With respect to the system, a project home page is created which allows access to project information from the outside world through the Internet. The server the page resides on connects to the network at the end of the project, making all engineering information available to the control system and plant personnel.

From the project home page log in, the operator enters a login and password, which determines what things the particular operator has permission to view or change. On the project web page, after logging in, the philosophy of the customer implementing the project is set forth, which reminds the individual logging in of the objectives for this project.

A project documents key is provided on the home page. Under project documents, items such as project schedule, organizational chart, meeting minutes, phone list, executive summary, and progress reports are accessible. If the project schedule is selected, then the current project schedule is retrieved and displayed. If anyone makes a change to the project schedule the next person logging on would see all those changes immediately. Also note that each item is a directory where new items can be published. Whenever anyone wants to publish the next meeting minutes, the minutes are put into that directory on the server and are immediately available. The phone list identifies people associated with the project and provides a simple way to contact anybody quickly. The executive summary is an overview of the project, hurdles that need to be knocked down, and other information needed by project executives. Everything on the summary can be time and date stamped. To make an executive summary, the operator clicks on the create box and enters a title such as motor status, and then enters the information. The information is then saved, and it immediately appears on the list and can be viewed.

Another item is a network drawing. The drawing can be accessed through a Java applet to the screen. The operator can zoom in or out, review, and print without having the specific CAD drawing package on the operator computer. Drawing standards can also be stored and reviewed by CAD operators to ensure that all drawings are up to date with standards. If a standard is to be changed, then the operator can make the change and publish it on the server so that it is available for immediate use.

On the P&IDs, a drawing example can be red lined over the Internet. This provides an alternate way of making drawing changes, instead of ink red lining copies and sending them back and forth through the mail. It also allows the operator to view the drawings in many locations at the same time through the web. Operators can make red line comments as different layers and at the end of making comments, can e-mail the person responsible for updating the drawings and make sure the changes get completed on time, which facilitates reducing travel costs and lost productive time.

A red line is made by clicking on the circle, placing the circle on the drawing where the change is to be made, grabbing text, typing in the text such as a change tag, then placing the text on the drawing. The redlines can be published to the server so that the redlines are now another layer on top of the drawings. The redlines are not part of the document yet; they are only a layer. The CAD person can be e-mailed to retrieve the red lines from all the people, make all necessary changes, and republish the drawings on the server throughout the web.

A list of the instrumentation of the plant also is accessible via the project home page. The list identifies a complete set of instrumentation being utilized in the plant, all information associated with the instrumentation, and the list is searchable. An operator can, for example, search for temperature transmitters and flow transmitters. The list also can be used to determine if the instrument vendors have given the correct instrumentation for the selected duty.

Sequential operating procedures (SOPs), which will be used by control systems later, also are accessible. The SOPs can be reviewed and updated by the customer and then placed back on the network. The system also can track when information has been changed.

The web page enables all members of the team, no matter where they are physically located, to access information about this project, discover the hurdles to be overcome, and track project documentation. This system server and information also becomes the engineering server at the plant.

Set forth below is a description of a particular embodiment of the above described system. As explained above, the particular implementation depends upon the specific application, and the system can be customized for each particular application.

The system includes internal resources for JAVA, HTML and Visual Basic scripting, AutoCAD and Microstation literate CAD personnel, certification as a Microsoft Solution Provider and network design knowledge. Once transported to the plant, the system server can be connected to the Ethernet network and interfaced to the control system to provide engineering data to the plant personnel from the central control system.

FIG. 1 is a block diagram of a system 10 in accordance with one embodiment of the present invention. System 10 includes a server 12 connected to a network 14, such as a company intranet. Network 14 is connected to a plurality of devices 16 so that users such as project teams and internet users can access network 14 and server 12. In one embodiment, devices 16 are computers including a web browser, and server 12 is accessible to devices 16 via the Internet 18. In an alternative embodiment, devices 16 are servers for a network of customer devices.

Devices 16 are interconnected to the Internet through many interfaces including through a network, such as a local area network (LAN) or a wide area network (WAN), through dial-in-connections, cable modems and special high-speed ISDN lines. Alternatively, devices 16 could be any device capable of interconnecting to the Internet including a web-based phone or other web-based connectable equipment. System 10 also includes a database 20 for storing information relating to the company, plant, and projects. In one embodiment, database 20 is stored on server 12. In an alternative embodiment, database 20 is remote from server 12. In either embodiment, database 20 can be accessed by users at one of devices 16 by logging in to server 12 through one of devices 16.

Figure 2:
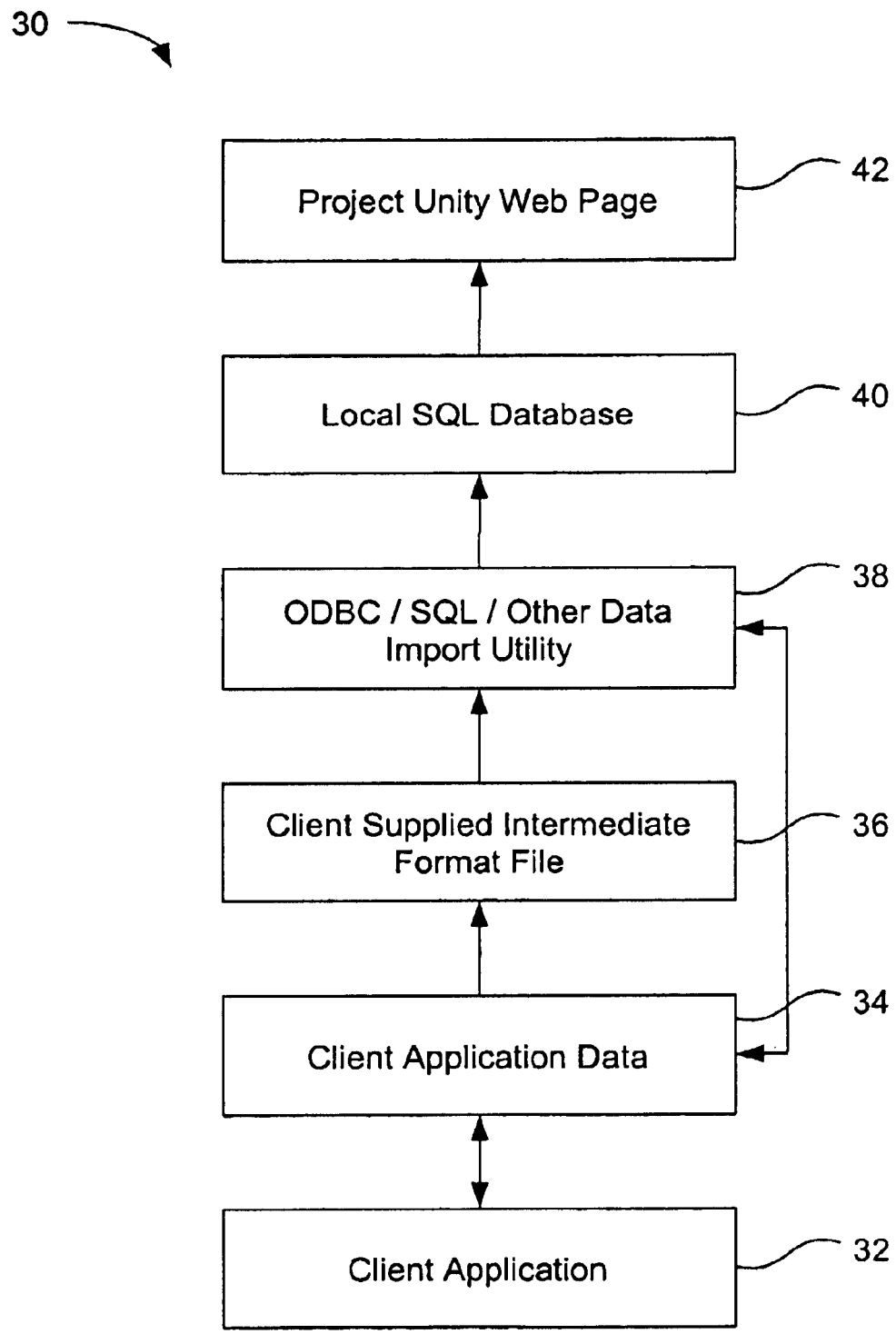
FIG. 2 is a block diagram of data transfer between a client application and the system shown in FIG. 1.

FIG. 2 is a block diagram 30 of data transfer between a client application and system 10 (shown in FIG. 1). Clients utilize a client application 32 to access database 20 (shown in FIG. 1). Initially, system 10 will not interact with client application 32 directly. However, depending upon permissions granted to, and by, the client, the client interacts directly with system 10 from a project web page (described below). The client then enters client application data 34.

If the client does not grant system 10 direct access to client data, system 10 directs the client to supply a neutral intermediate format file 36 with the requested information. If the client has authorized system 10 to access client data directly, the information is accessed by system 10 directly with a data import utility 38. Data import utility 38, in one embodiment, is a custom data import utility specific to the needs, file type, and format of each client. A local SQL database 40 accesses client application data 34 via at least one data import utility 38. In addition, a web page 42 for the company utilizes Active Server Page (ASP) technology and the page is populated with information contained in local SQL database 40. System 10 requests data updates from the client to client application data 34, depending upon permissions granted by the client.

FIG. 3 is an exemplary home page 50 (for example, a Project Unity Home Page) utilized to access system 10 (shown in FIG. 1). Home page 50 includes a Project Unity Login button 52, an About Project Unity button 54, and a Contact Us button 56. About Project Unity button 54 transfers the user to a page that provides detailed information about Project Unity to the user. Contact Us button 56 transfers the user to a page that provides information on how to contact an appropriate representative of the company that developed and implemented the project, i.e., Project Unity. Login button 52 transfers the user to a login page as described below in greater detail.

Figure 4:
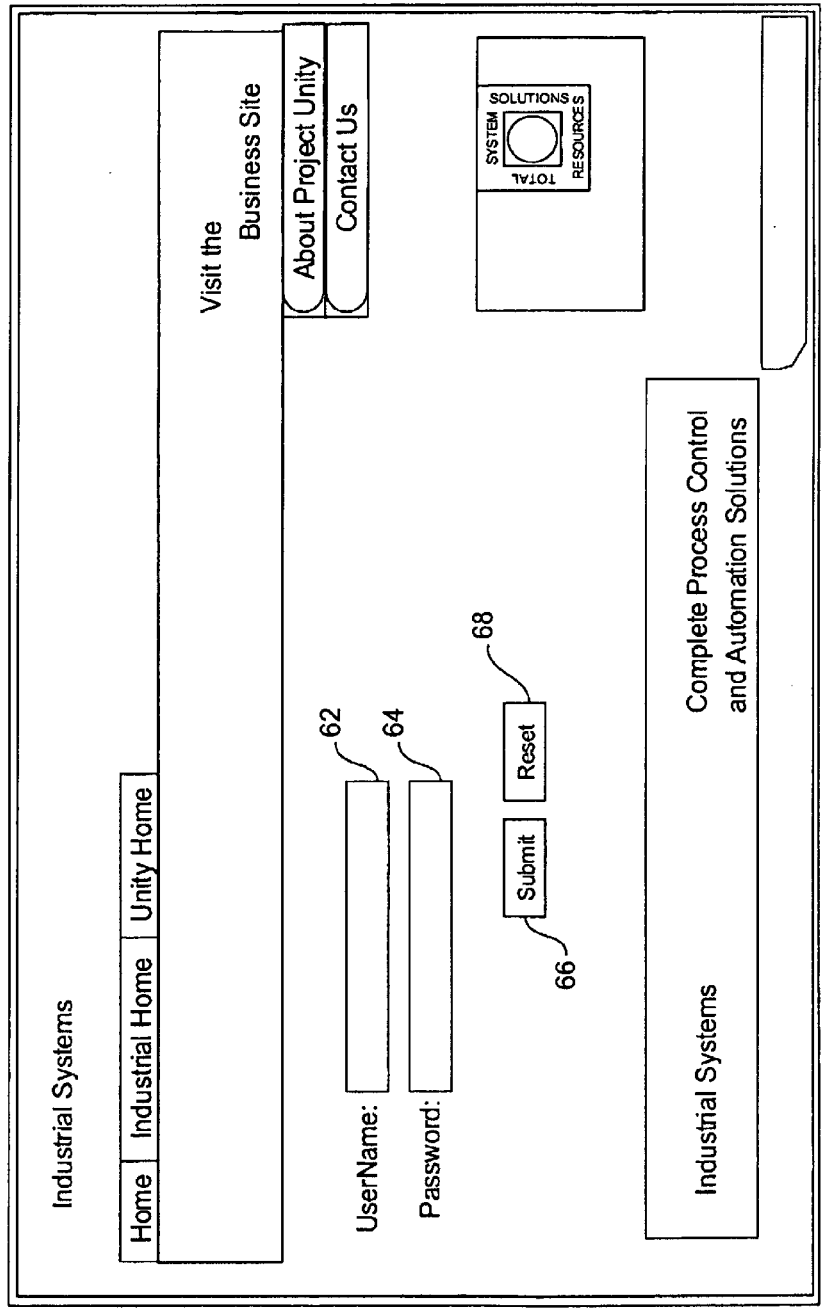
FIG. 4 is an exemplary login page to log in to the system shown in FIG. 1.

FIG. 4 is an exemplary Login page 60. Security is provided by system 10 (shown in FIG. 1) to ensure that users logging into system 10 utilize the login page. The functionality of the application, i.e., Project Unity, begins with a user logging in at Login page 60. Login page 60 includes a username block 62 and a password block 64 that prompts the user to log in to the application using a username and password combination assigned by an application administrator. All users log in to the application using the username and password combination unless they have already been authenticated by a trusted intranet accessible to other personnel.

If an intranet user attempts to access system 10 the Project Unity application, intranet authentication information is passed to system 10 for authentication. The intranet user is not requested to enter their username and password combination information a second time when using the Project Unity application. If the intranet user is recognized by system 10 as a valid Project Unity member, a project selection page (not shown in FIG. 4) is available from the intranet. If the intranet user is not recognized as a valid Project Unity member, the system re-directs the user to Login page 60.

Login page 60 also includes a Submit button 66 and a Reset button 68. Selection of Submit button 66 transmits the information input by the user to server 12 (shown in FIG. 1). Selection of Reset button 68 clears username block 62 and password block 64 so new information can be input by the user.

Figure 5:
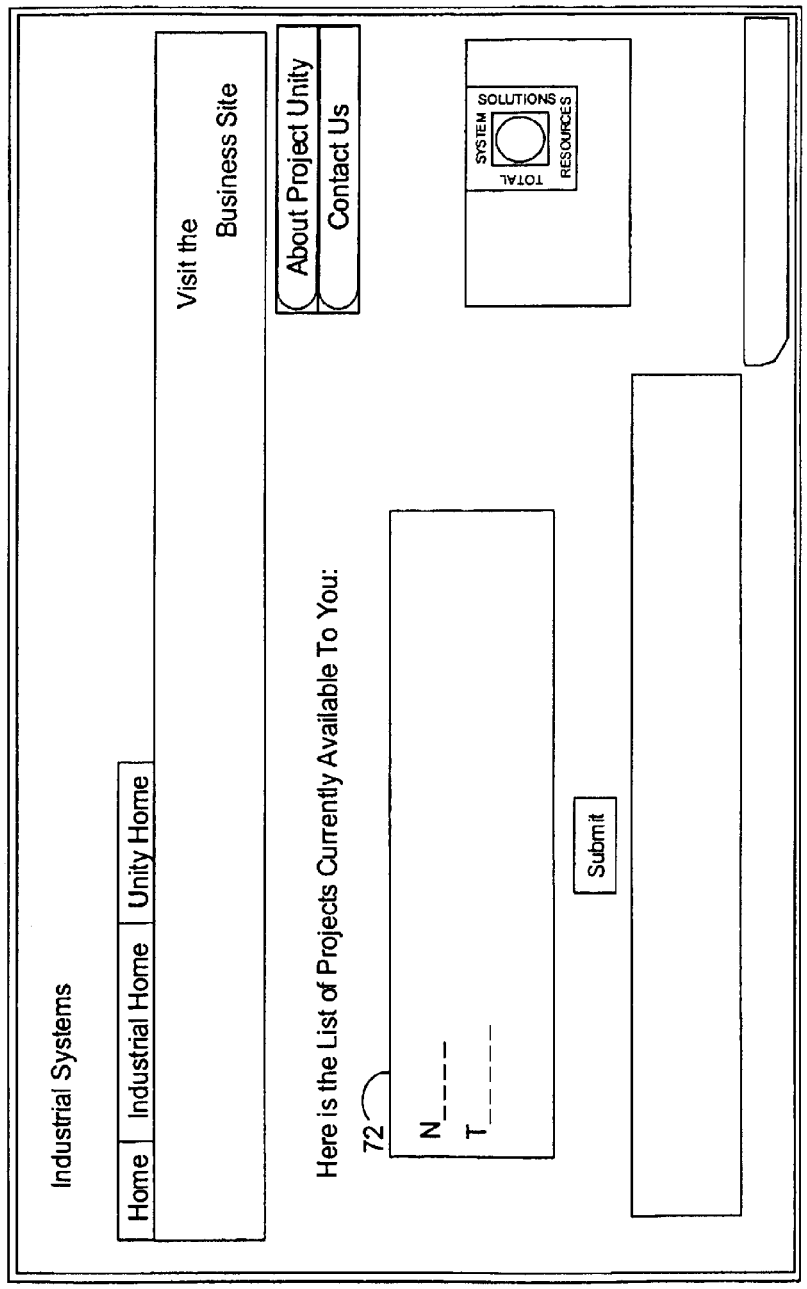
FIG. 5 is an exemplary Project List page.

Upon successful authentication to the Project Unity application, system 10 displays a project list page, such as Project List page 70, shown in FIG. 5. Referring to FIG. 5, Project List page 70 displays a project list 72 that lists the projects the user has rights to access and view. System 10 receives the selection of a particular project selected by the user from the project list. System 10 transfers the user to a home page (not shown in FIG. 5) for the selected project. For users assigned only one project, system 10 automatically displays that particular project home page and does not display Project List page 70 to that user. In order to view another project, the user returns to Project List page 70.

There are four main groups of users that make up the user base of the Project Unity application. The four user groups include Super Users, Project Administrators, Project Team Members, and Third-Party Users. Super Users are application administrators responsible for creating application user accounts, initially setting up projects, maintaining the application, and performing help desk functions for users of system 10. The Super User group has the ability to look at all information entered in database 20 for all projects. The Super User Group utilizes application administration forms to create the accounts for new users. In addition, the Super User Group is able to tie the account to a project team member, as well as create a new project in system 10.

Project Administrators are users who have the ability to administer the project information within database 20. Project Administrators are able to add and edit project information, including key project information, using site administration forms.

Project Team Members are users who are part of the project team and have the ability to view project information as well as perform certain project administration tasks, such as enter a time sheet and take advantage of toolkit functionality, as well as other tasks.

Third-Party Users are members of a special group of users that are provided access to certain pieces of project information, but otherwise have no rights to perform any functions within the Project Unity application.

The security model implemented for the Project Unity application is based on the individual user and project. When a user is authenticated and chooses a project from project list 72, the functionality of the application available to the user and the information the user can view are based on the user level permission provided that user when the user was added as a member of a project team. In an alternative embodiment, the functionality of the application available to the user and the information the user can view are based entirely on the user level permission provided that user.

Figure 6:
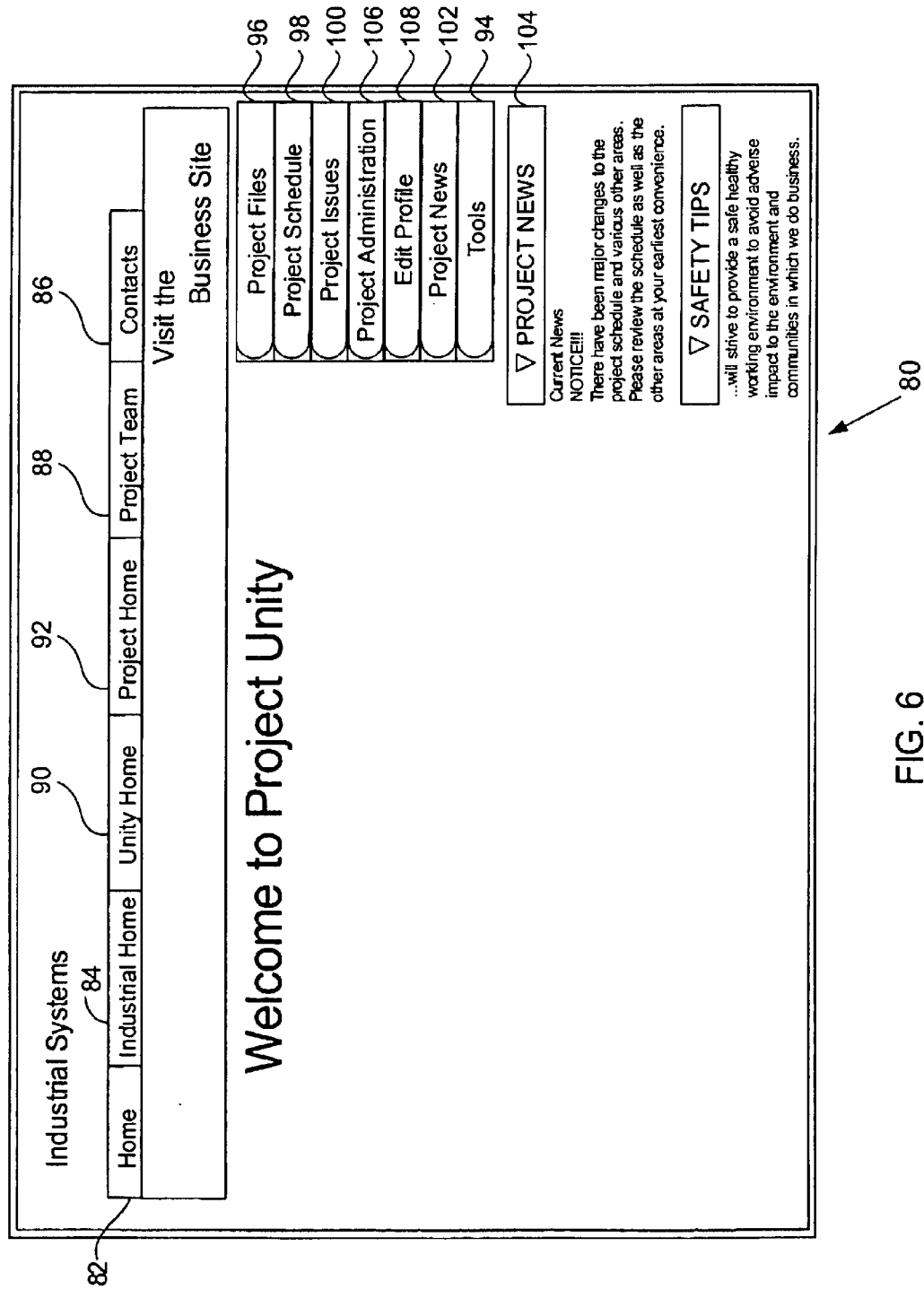
FIG. 6 is an exemplary Project Home page.

FIG. 6 is an exemplary Project Home page 80 including a company home page button 82, a business home page button 84, and a Contacts button 86. Contacts button 86 transfers the user to a Contacts page (not shown) that includes a series of navigation buttons and database information pertaining to contacts. The database information is populated by the project administrator. Page 80 also includes a Project Team button 88 that, when selected, transfers the user to a Project Team page including a series of navigation buttons and database information pertaining to a project team list. The database information is populated by the project administrator such that an external person viewing page 80 only sees select personnel as dictated by the project administrator. Page 80 further includes a Unity Home button 90, a Project Home button 92, and a Tools button 94. Tools button 94 transfers the user to a Tools page which includes the utilities to edit project financials and project timesheets.

Project Home page 80 further includes a Project Files button 96 which transfers the user to a file managing software application such as, but not limited to, Bentley ProjectWise, Blueline Online, PCDOCS, or others. Authentication to system 10 provides users a bypass to the software application's authentication process. A Project Schedule button 98 transfers the user to a project schedule page populated with project schedule database information. The project schedule page displays a series of navigation buttons. Alternatively, the project schedule page integrates third party software such as, but not limited to, Microsoft Project, Primavira Suretrack, Primavira Expedition, and others. In one embodiment, the project scheduling software utilized is Microsoft Project.

Project Home page 80 also includes a Project Issues button 100 that transfers the user to a project issues page. The project issues page prompts the user to enter a new issue, update an existing issue, or input issue details. A Project Issues button 100 transfers the user to a project issues page that includes project issues information which resides in a database administrated by the project administrator. Alternatively, system 10 integrates project issues information with third party software such as Primavira Expedition, SAP, and others. The project issues page includes a tracking section (not shown) and a preferred vendors section (not shown).

Home page 80 further includes a Project News button 102 and a Project News area 104 that reside as text files edited by the project administrator. In an exemplary embodiment, a relational database facilitates the above described functionality and the site runs on the latest version of IIS on an NT 4.0 server. Appropriate security protects proprietary information input into database 20. In addition, Home page 80 includes a Project Administration button 106 which transfers the user to a project administration page (not shown). The project administration page includes a Project Financials button (not shown) which is restricted to users assigned by the project administrator. The project financials have two views. One view is for customers and the other view is for the project managers and select project personnel. The project financials include a cost summary and an invoice summary. The project administration page further includes a Project Timesheet button (not shown) for displaying a project timesheet page which prompts team members to fill in weekly timesheets. The project administrator is then prompted to view the completed timesheets. The project administration page also includes a site administration section for the editing of the project team, contacts, scope, news, and safety message. Project home page 80 also includes an Edit Profile button 108.

System 10 includes a document management system, such as Project Wise, available from Bentley, to provide secure access to documents via the web. The Project Unity application enables users the ability to collaborate on project documents under the control of a document management system such as Bentley Systems ProjectWise. The document management system includes three different clients available for document control. A browser client allows only basic viewing capability. A Java client allows full access to documents. A Windows client allows full access to documents when software is installed on one of devices 16 (shown in FIG. 1), such as a local machine. In one embodiment, the Windows client is utilized by CAD users. System 10 provides the user a choice of interfaces and launches the appropriate interface when selected. Since the Project Unity application is integrated with the project document manager, the user does not have to log in to the project document manager once authenticated into the Project Unity application.

The document management system stores and controls documents. In one embodiment, the document management system includes tools to allow viewing and red-lining of CAD drawings using the Java Client via the Internet. In addition, the document management system is capable of displaying many common format files in an HTML format. Project data is stored on server 12, which in one embodiment, is located remotely from the company, such as at a site maintained by an outside firewall company. This location enables users to access system 10 from anywhere inside or outside the company's network while still providing for full authorization of users entering server 12. In addition, this location prevents users from being able to tunnel into the company's network. An additional feature of system 10 is the validation of each user before allowing them access to secure project data.

Figure 7:
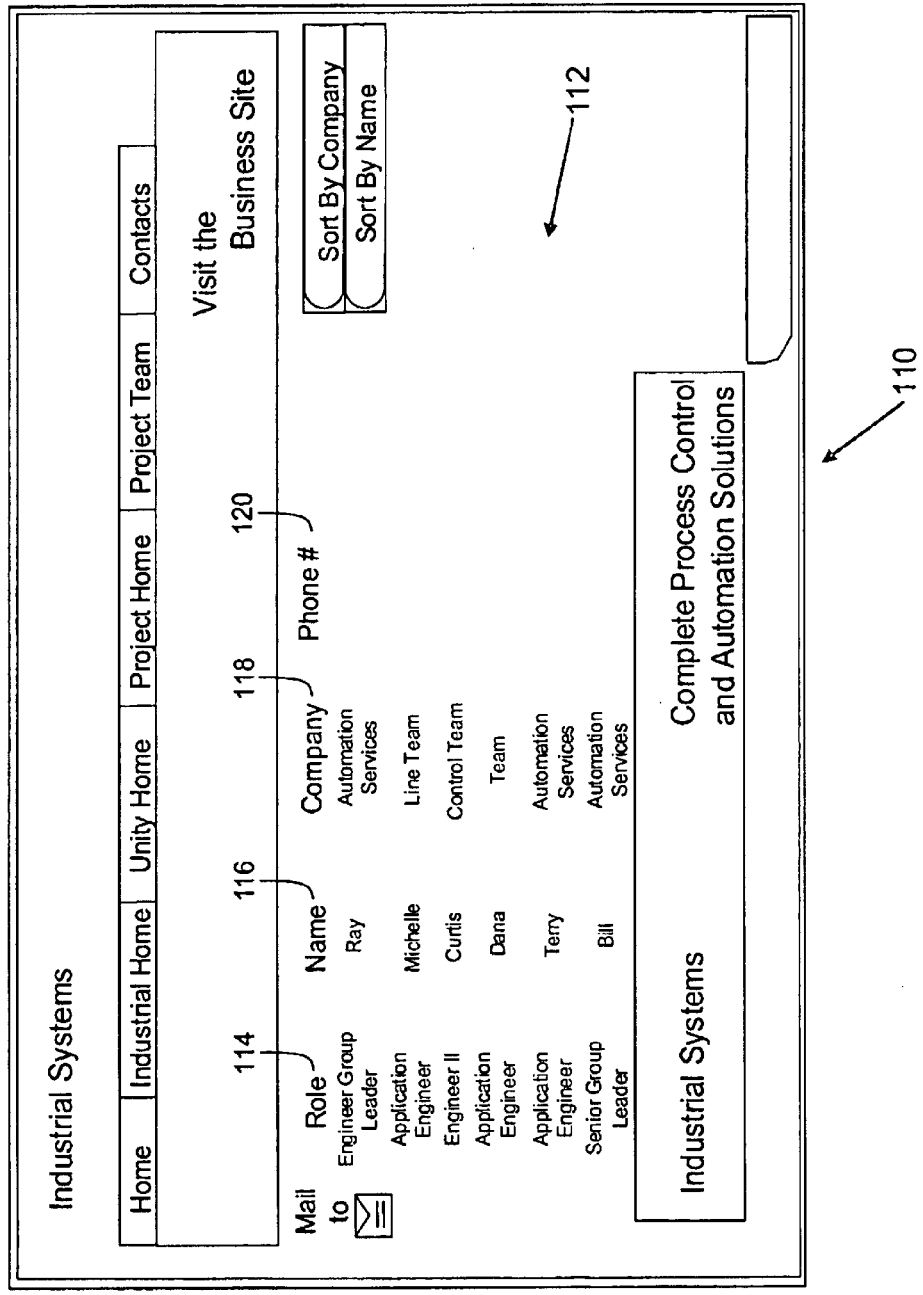
FIG. 7 is an exemplary team members listing page.

FIG. 7 is an exemplary team members listing page 110 including a list 112 of team members. List 112 includes a team member's role 114 on the team, their name 116, a company 118 for which they work, and a business phone number 120. In an alternative embodiment, a team member is not an individual, but rather a company or a group within a company, which changes, slightly, the information listed about the team member in list 112. To receive detailed information regarding a team member, the user selects a team member in list 112. The user can also view an organizational chart (not shown) showing the reporting chain within the project team.

Figure 8:
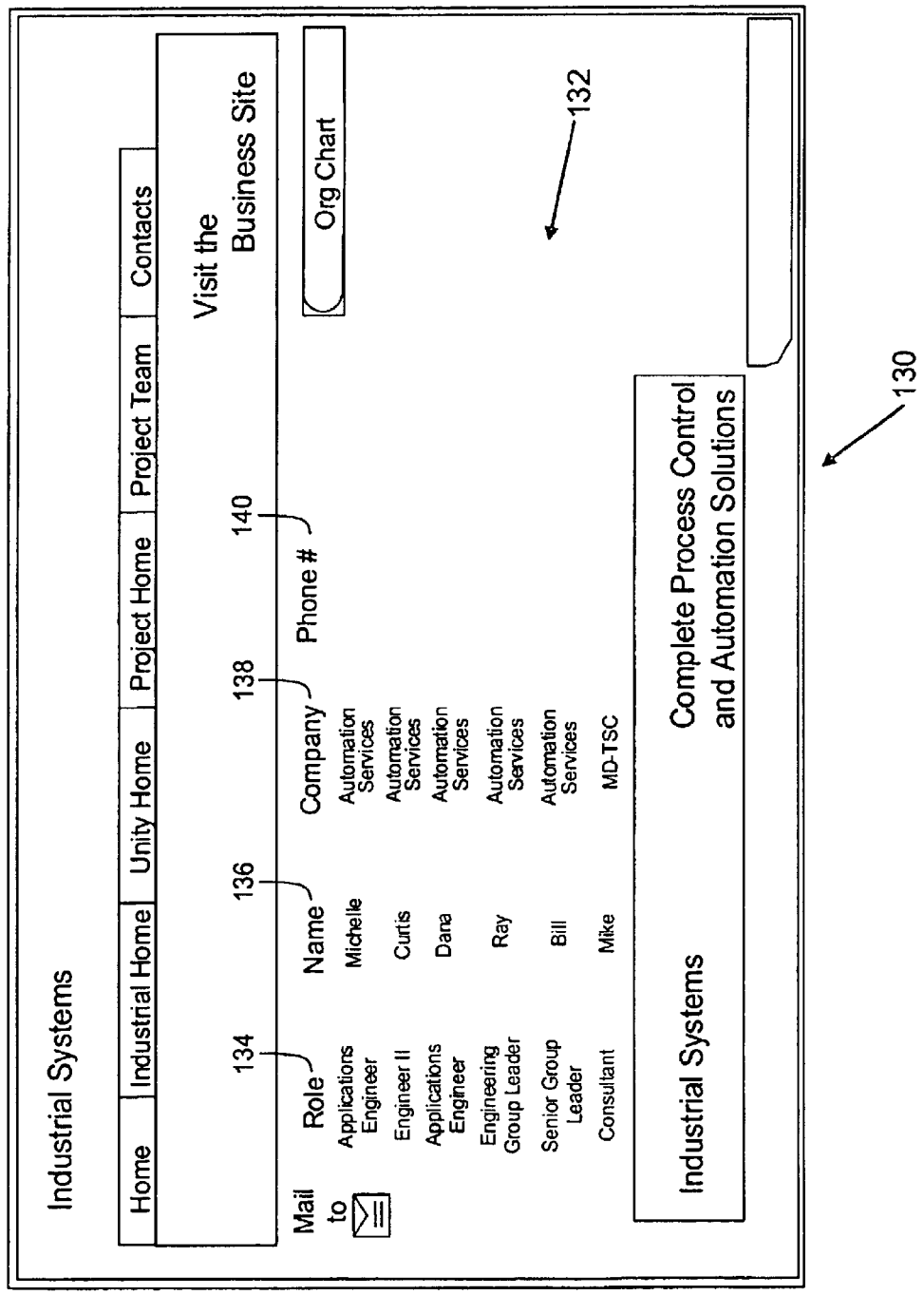
FIG. 8 is an exemplary contact list page.

FIG. 8 is an exemplary contact list page 130 including a list 132 of contacts. List 132 includes the contact's role 134, their name 136, a company 138 for which they work, and a business phone number 140. In an alternative embodiment, a contact is not an individual, but rather, a company or a group within a company, which slightly changes the information listed. Once a contact is selected, detailed information about the contact is displayed by system 10 (shown in FIG. 1).

Figure 9:
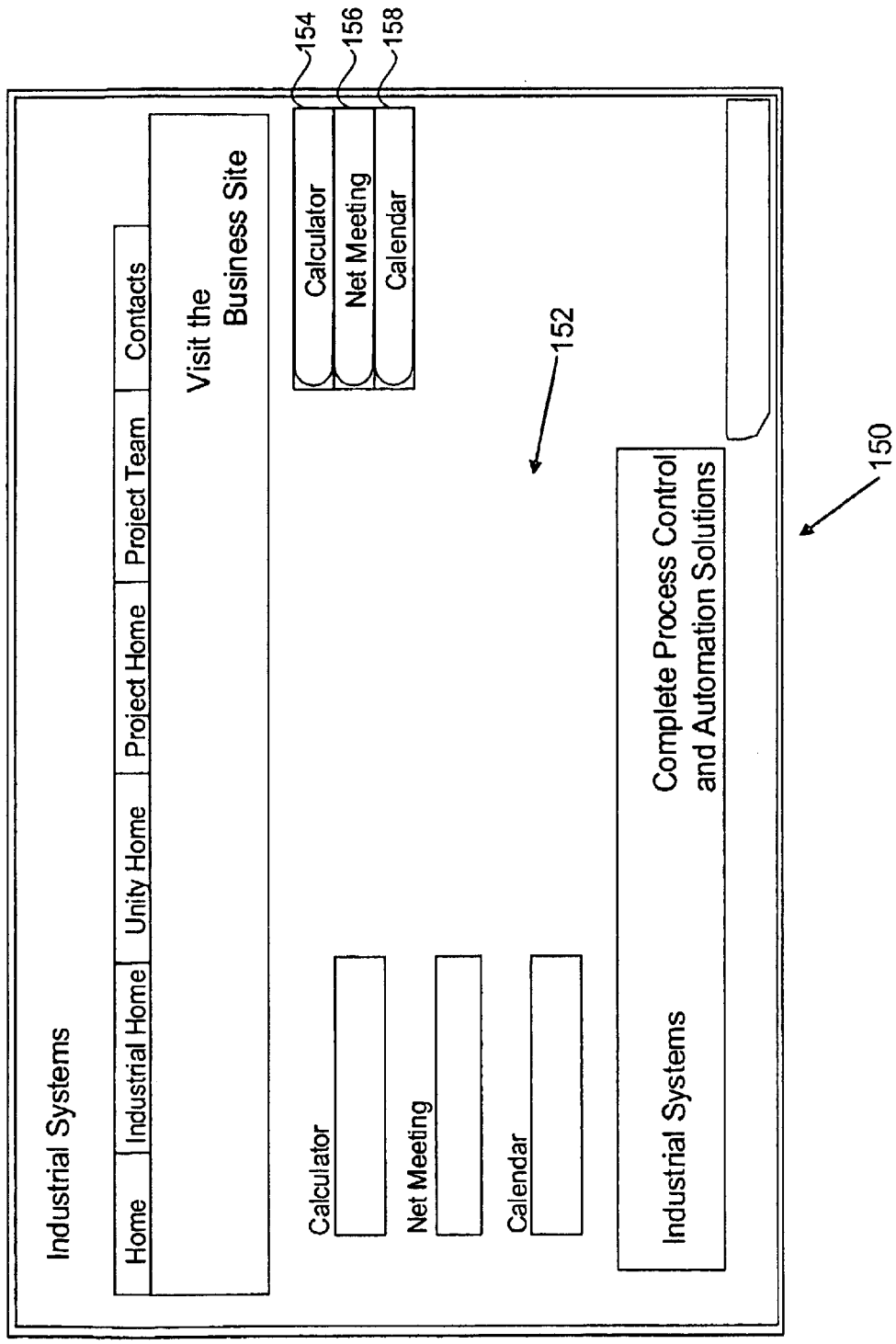
FIG. 9 is an exemplary tool kit page.

FIG. 9 is an exemplary tool kit page 150 including a set of hyperlinks 152 to project management tools included to add benefit to the application. The tools are listed in a toolkit which includes a short description of each tool. For example, the tools include a calculator 154, a net meeting 156, and a calendar 158.

FIG. 10 is an exemplary project issues page 160 including a filter by block 162 and a sort by block 164. Project team members inform project management of issues currently posing some problem with the project by inputting the issues into issues page 160. As well, project management utilize the Project Unity application to manage the issues by assigning responsible parties to individual issues, changing the status of an issue, or deleting an issue from system 10 if the issue is deemed to be an invalid entry. Project Issues are viewed in an issue list 166 available to project team members from project home page 80, and can be sorted and filtered using several criteria for enhanced views of the issue list. Project issue list 166 includes several categories such as status 168, issue date 170, issue number 172, description 174, a target date 176, and responsible 178. An issue is selected out of the issue list to view the detailed information of the issue. From the project issue list, it is possible for project team members to add issues to the issues list associated with the project.

Figure 11:
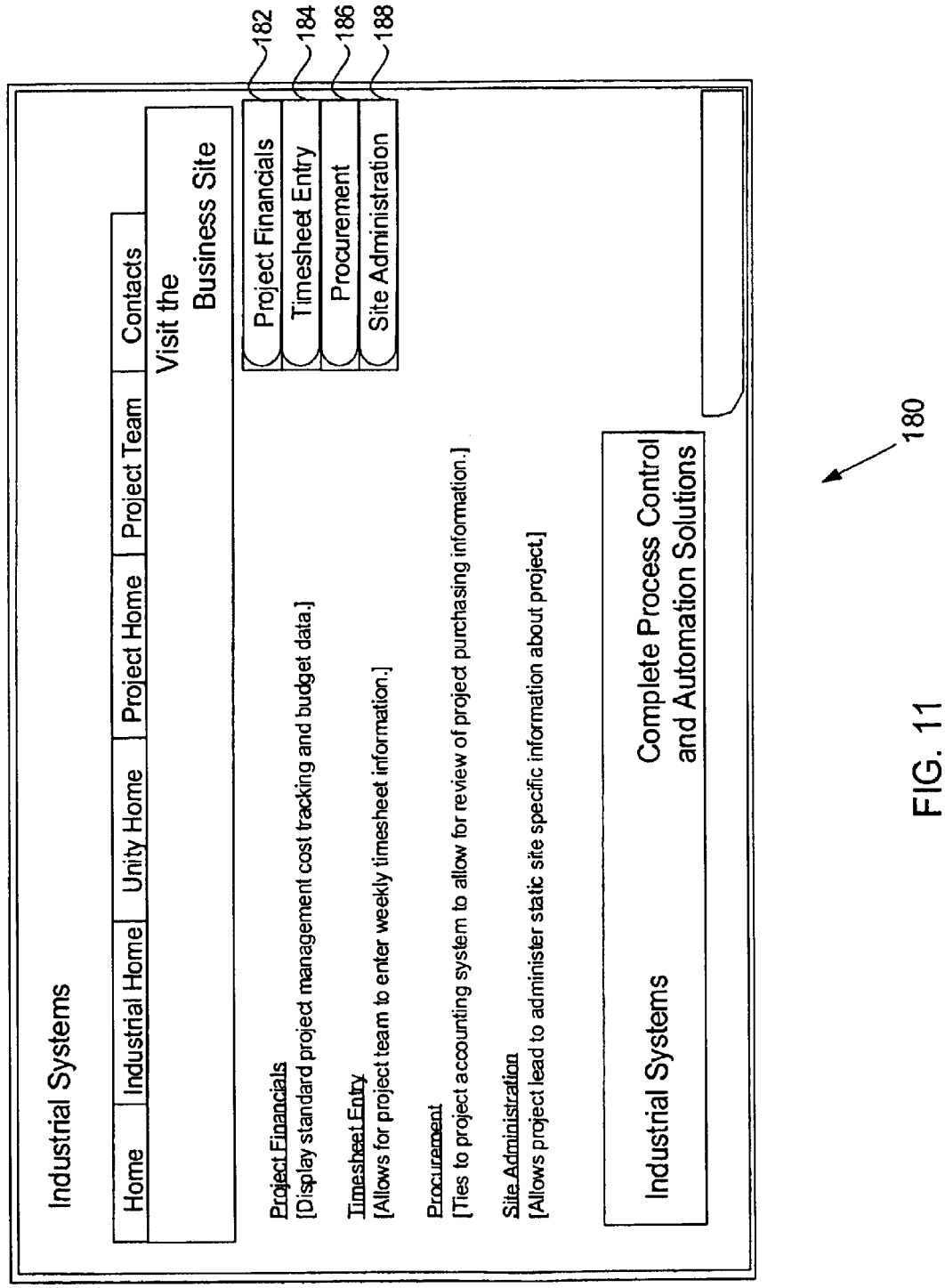
FIG. 11 is an exemplary project administration page.

FIG. 11 is an exemplary project administration page 180 including a Project Financials button 182 to display project management cost tracking and budget data, a Timesheet Entry button 184 for project teams to enter weekly timesheet information, a Procurement button 186 that ties to a project accounting system to allow for review of project purchasing information, and a Site Administration button 188 that allows the project leader to administer static site specific information about the project. Selection of Time Sheet Entry button 184 enables every team member to perform the administrative task of entering time sheet data for time spent working on the project.

Figure 12:
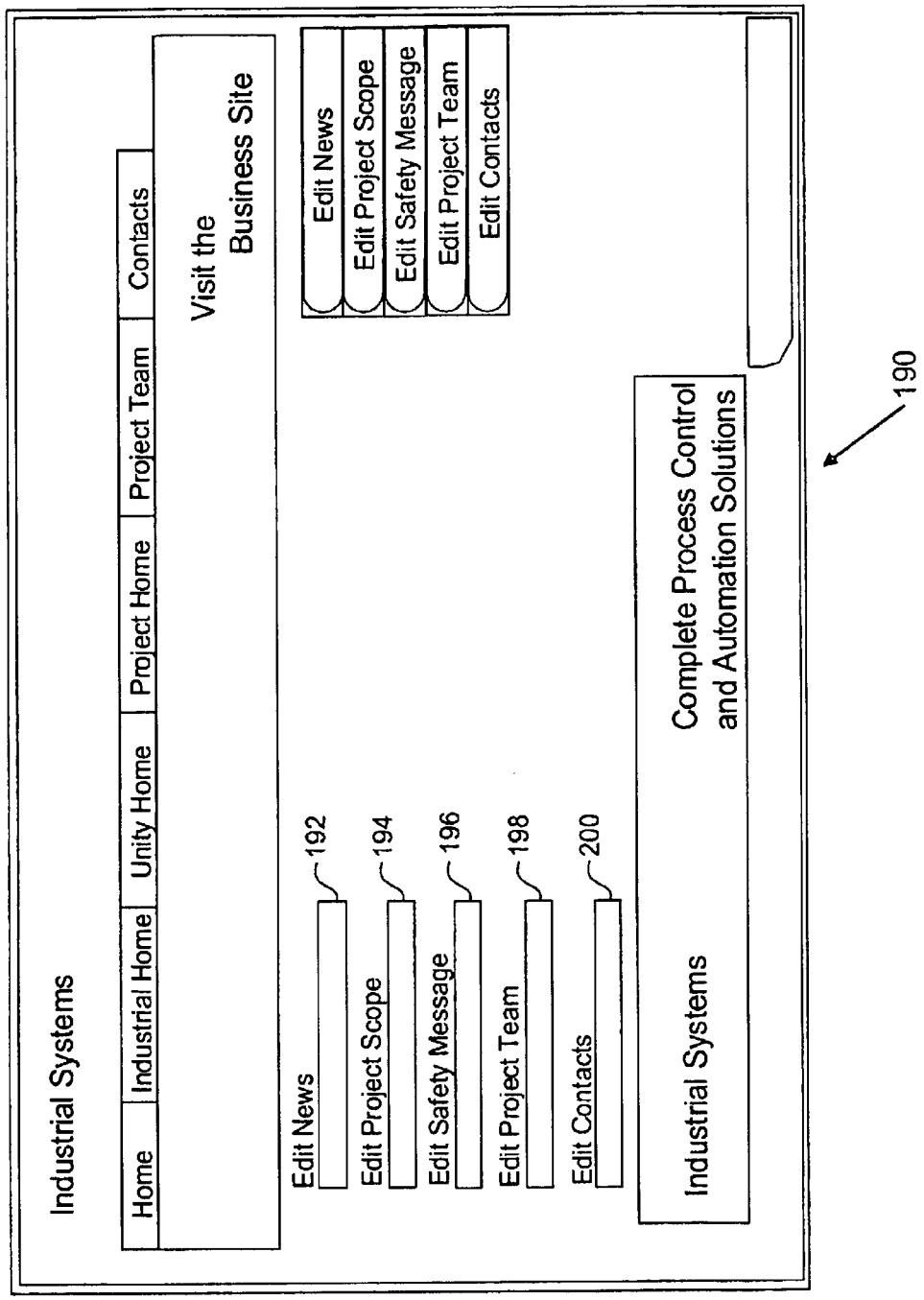
FIG. 12 is an exemplary site administration page.

Selection of Site Administration button 188 takes the user to a site administration page, such as exemplary site administration page 190 shown in FIG. 12. Site administration page 190 includes an edit news block 192, an edit project scope block 194, an edit safety message block 196, an edit project team block 198, and an edit contacts block 200. Administrators edit information within system 10 by selecting the appropriate blocks and supplying the correct information.

Figure 13:
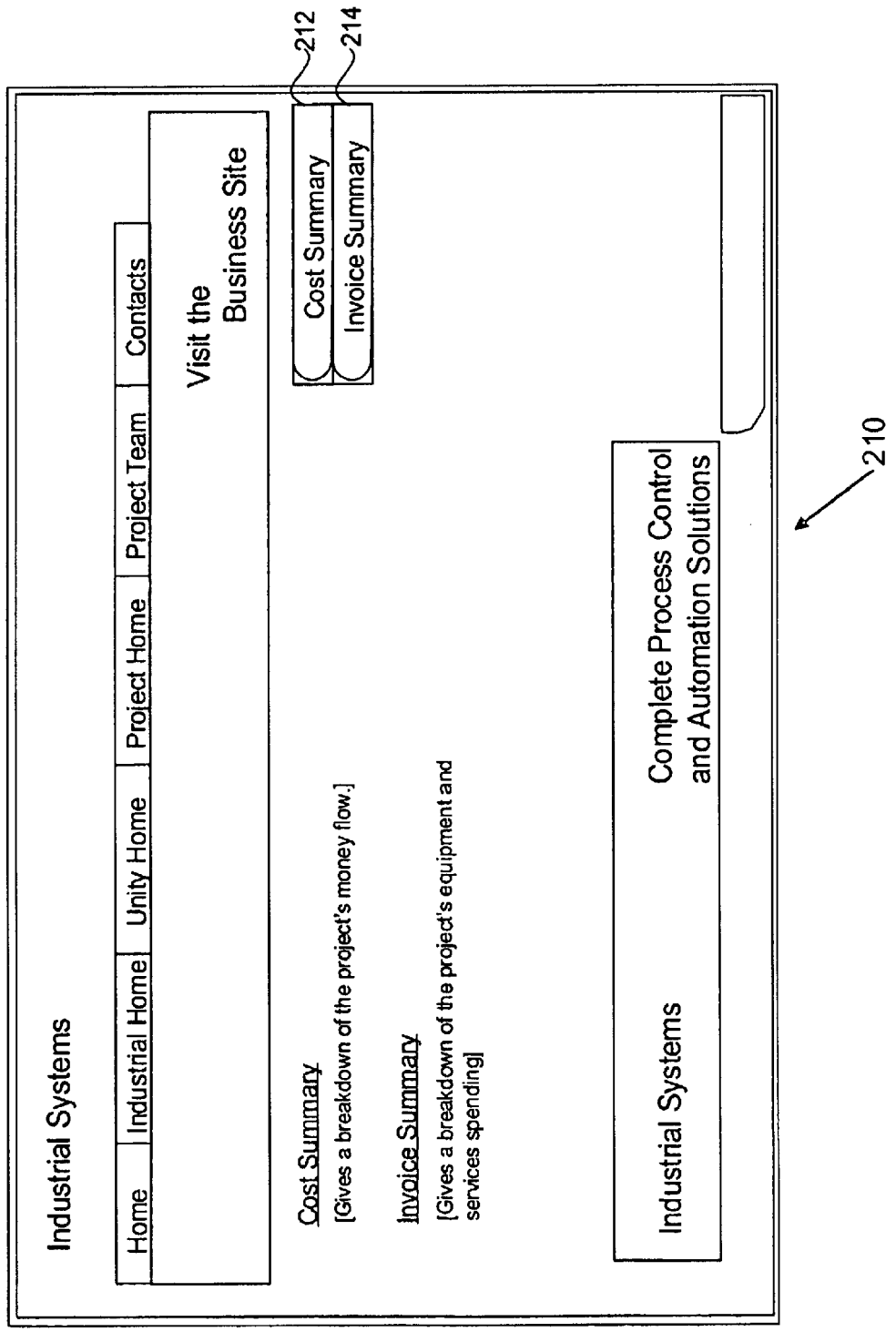
FIG. 13 is an exemplary financials pa ge.

Selection of Project Financials button 182 takes the user to a project financials page, such as exemplary financials page 210 shown in FIG. 13. Financials page 210 includes a cost summary button 212 which provides a breakdown of the project's money flow and an invoice summary button 214 which provides a breakdown of the project's equipment and services spending. Project Financials are available to select users who have the ability to view financial information of the project, including invoice summaries, cost summaries, budget information, and information.

Figure 14:
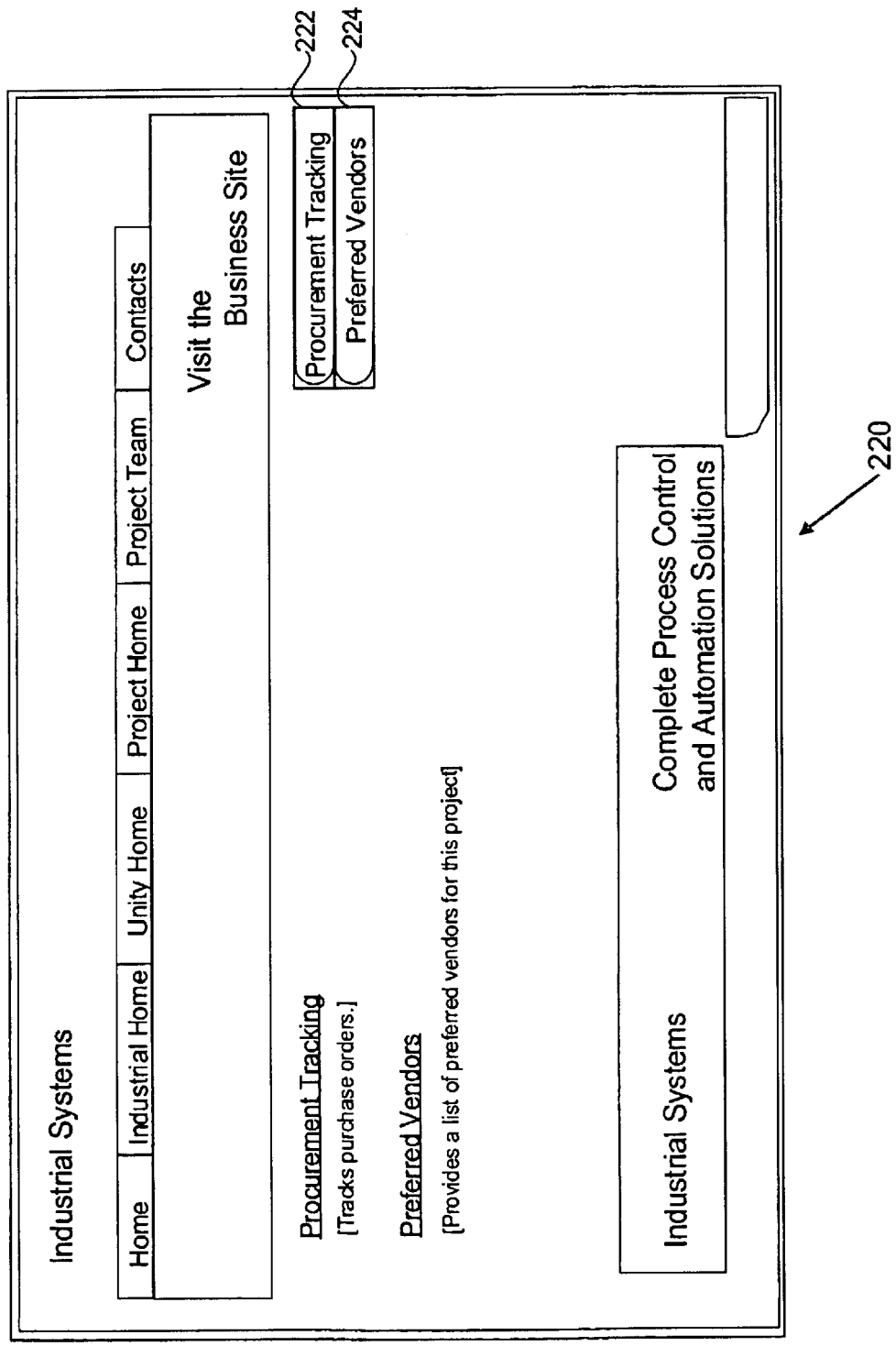
FIG. 14 is an exemplary procurement page.

Selection of Procurement button 186 takes the user to a procurement page, such as exemplary procurement page 220 shown in FIG. 14. Procurement page 220 includes a procurement tracking button 222 which tracks purchase orders and a preferred vendors button 224 which provides a list of preferred vendors for the project. Procurement page 220 offers project management the ability to look at procurement lists, as well as a list of preferred vendors for the project.

FIG. 15 is an exemplary Project News and Project Safety Tips page 230 that provides important project information to all team members using the Project Unity application. News articles and safety tips are displayed on the Project News and Project Safety Tips page 230 for the edification of the project team member logging in to the application. In an alternative embodiment, system 10 (shown in FIG. 1) displays a list of either news articles or safety tips once either news article button (not shown) or a safety tips button (not shown), respectively, are selected by the user.

The Project Unity application business object model includes business objects that have collaborative associations with other objects, internal attributes, and business rules that dictate the functional requirements of the implementation of the business objects. Each business object, the business rules that govern it, its relationships with other objects, and its attributes are defined below. The definition of these business objects lay the foundation upon which the technical implementation of Project Unity is built.

Project

The PROJECT object contains general information about a project that is being managed through the Project Unity application.

Business Rules

The PROJECT object is the central object in the Project Unity application. Everything in the application is based on the project that is being described by the PROJECT object.

The PROJECT object is added to the Project Unity database by the Super User group as part of their application administration duties. When a client starts a project for management under the Project Unity application, a notification must be sent to the application administration team, so that the project can be added to the Project Unity database. The application administration task of adding a project to the Project Unity database involves providing an internal name for the project and giving the project a status of "Active".

The PROJECT object is viewable to all users of the Project Unity application. The project title and scope description are displayed on the project home page after a user has been authenticated in the application. This information is editable through the site administration functionality by members of the Project Administration group or the Super User group. The project status and project name attributes are only editable by the Super User group as part of their application administration duties.

A project can have three different statuses based on the level of completeness of the project. From the time the project is added to the Project Unity database, the project is in an "Active" status, meaning work is currently being done on the project. When a project is completed or otherwise terminated, but the client still has reason to provide the project team with the ability to view the project information, the project is placed in an "Inactive" status. When the project is no longer required to be in the Project Unity database and should not be seen by team members still associated with the project, the project status is set to "Archived". The "Archived" status prevents anyone from viewing the application and signals the application administrators that the project is ready to be removed from the database and archived with the other project files.

From "Active", a project can be placed in either an "Inactive" or "Archived" status. As well, from "Inactive", a project can be "Archived" or can be reset to "Active". A project in "Archived" can be placed in an "Active" or "Inactive" status should it be desired to have the project accessible by a project team after the project is placed in an "Archived" status.

A project is deleted by the Super User group when the project is in the "Archived" status. The process of deleting a project removes the team members from the project and all other project information in the system such as News, Safety Tips, Invoices, Costs, Procurements, Preferred Vendors, Contacts, and Issues. Before deleting a project, the project information is exported into a format that can be burned to a CD with the project documents for archival purposes.

Relationships

PROJECT TO CLIENT—A PROJECT is managed using the Project Unity application services purchased by the CLIENT. A PROJECT is associated with only one CLIENT. A Super User performs the assignment of the relationship between a CLIENT and a PROJECT as part of their application administration duties.

PROJECT TO TEAM MEMBER—A PROJECT includes multiple TEAM MEMBERS that include the project team. A project manager is responsible for assigning a TEAM MEMBER from the member pool shared across all projects being run by the same client.

PROJECT TO CONTACT—A PROJECT includes a list of CONTACTS entered into the Project Unity application. A PROJECT can have zero or more CONTACTS associated with it.

PROJECT TO PROJECT ISSUE—A PROJECT includes PROJECT ISSUES that have been entered into the Project Unity application. A PROJECT can have zero or more PROJECT ISSUES.

PROJECT TO NEWS ARTICLE—A PROJECT includes NEWS ARTICLES that relate news items to the members of the project team. A PROJECT can have zero or more NEWS ARTICLES.

PROJECT TO SAFETY TIP—A PROJECT includes SAFETY TIPS that impart safety information to members of the project team. A PROJECT can have zero or more SAFETY TIPS.

PROJECT TO PREFERRED VENDOR—A PROJECT includes a list of PREFERRED VENDORS that have been entered into the Project Unity application. A PROJECT can have zero or more PREFERRED VENDORS associated with it.

PROJECT TO PROCUREMENT—A PROJECT includes a set of PROCUREMENTS that have been imported into the Project Unity database from an external source. A PROJECT can have zero or more PROCUREMENTS.

PROJECT TO INVOICE—A PROJECT includes a set of INVOICES that have been imported into the Project Unity application from an external financial system. A PROJECT can have zero or more INVOICES.

PROJECT TO COST—A PROJECT includes a set of COSTS that have been imported into the Project Unity application from an external financial system. A PROJECT can have zero or more COSTS.

Client

The CLIENT object contains information about the company that has purchased the Project Unity application services to take advantage of the project management capabilities of the application.

Business Rules

The CLIENT object associates a project and its resources with a company.

The CLIENT object is added to the Project Unity database by the Super User as part of their application administration duties. The Super User supplies the client's company name and address information (address line 1, city, state, zip code) to add a client to the system.

The CLIENT object is not viewable to anyone from within the Project Unity database.

The CLIENT object is updated by the Super User group using the application administration tools.

The CLIENT object is deleted from the Project Unity database if the client is not currently associated with any Active, Inactive, or Archived project in the database. The Super User group is the group of users that has the ability to delete a client.

Relationships

CLIENT TO PROJECT—A CLIENT uses the Project Unity application to manage a PROJECT. A CLIENT can be associated with one or more active, inactive, or archived PROJECTS simultaneously. A Super User performs the assignment of the relationship between a CLIENT and a PROJECT as part of their application administration duties.

Team Member

The TEAM MEMBER object contains information about an individual, a company, or a group/division that has been assigned to be a member of the project team.

Business Rules

The TEAM MEMBER object ties a Project Unity application user to a member of a project team. A team member is an application user who has been associated with a team by defining the team member's role on the project and giving the user security rights for the particular project.

The creation of a team member is a two-step process. The first step is the creation of the application user in the Project Unity application. This process is performed by an application administrator who assigns a username and password and associates the user with a client. The application user then populates their TEAM MEMBER attributes, or profile, through the application front-end when they login to the application for the first time. The user changes their password on the first login attempt to the Project Unity application.

The second step to create a team member is the assignment of a team member to a project. This step is performed by a user in the Project Administration group who associates a team member with a project, defines the team member's role on the project, and designates the security rights of the user. The project manager picks team members from the list of users that have been associated with the client that is running the current project. In other words, if an individual works on two projects that are being run by two different clients, the individual needs to have two application user accounts associated with the two clients, and therefore maintains two separate team member profiles.

An application user can update the team member profile associated with a specific client through the Update User Profile functionality on the project home page of any project that the client is running. To update profiles established for use on projects for different clients, the application user logs in using both usernames and edits the two profiles independently.

There are two pieces of functionality associated with a team member, the Project Team List and the Organization Chart. The project team list is a list of the team members associated with the current project. The organizational chart is functionality that will draw the hierarchical chart of the reporting relationships within the project team.

The project team list displays the list of the project team members of the current project. The list displays the team member's name, company, business phone number, and role on the team. A user selects a team member in the list and views detailed information about the team member, including business address, contact information, and e-mail address.

The population of the project team list is based on the security rights given to the user. The members of the Super User group, the Project Administration group, and the Project Team group are granted rights to see the entire project team list. However, the Third-Party group can be prevented from seeing individual team members in the project team list. To satisfy this business rule, a team member is designated as a viewable member of the project team to the Third-Party user group, when the team member is associated with a project. This designation is made on a project-by-project basis.

The organizational chart displays a hierarchical view of the reporting relationships within the project team. Every member of the Super User group, the Project Administration group, and the Project Team group are granted rights to view the organization chart, however, the Third-Party user group is granted rights to view the organization chart on a user-by-user basis. When a member of the Third-Party user group is associated with a project, the project manager designates whether or not the user is able to view the organizational chart. In one embodiment, the security right is an all or nothing privilege, either the user can see the organizational chart or the user cannot see the organizational chart.

The Project Administration group includes the ability to delete a project team member from a project, which removes the association of an application user with a project. A Super User group member is able to delete an application user from the system as part of their application administration duties. This deletion is only allowable if the user is no longer associated with a project in the Project Unity database.

Relationships

TEAM MEMBER TO PROJECT—A TEAM MEMBER is an individual, company, or group/division associated with a PROJECT as a member of the project team. A TEAM MEMBER is associated with multiple PROJECTS that are all associated with the same CLIENT. Users from the Super User group as well as select users of the Project Administration group can associate as an individual, company, or group/division to an active PROJECT.

Contact

The CONTACT object contains information about an individual, a company, or a group/division that has been designated as a contact for the project.

Business Rules

The CONTACT object is an object used to maintain a set of contacts associated with a project. In terms of the business object model for the Project Unity application, the CONTACT object is an independent object that has no direct association with the TEAM MEMBER object or the PREFERRED VENDOR object. As well, contact information is not sharable across multiple projects managed by the same client, as with team members. Contact information is entered into the system by the project administrators of each project.

The creation of a contact is performed by a member of the Super User group or a member of the Project Administration group. The contact is automatically associated with the project the user selected when entering the application. The attributes of the CONTACT object are populated at the time of creation. These attributes can be edited by the Super User group or the Project Administration group through the site administration forms available in the application.

The contact list displays the list of contacts associated with the current project. The list includes the contact's name, company, and business phone number. A user can select a contact in the list and view detailed information about the team member, including business address, contact information, and e-mail address.

The population of the contact list is based on the security rights given to the user. The members of the Super User group, the Project Administration group, and the Project Team group are granted rights to see the entire contact list. However, the Third-Party group can be prevented from seeing individual contacts in the contact list. To satisfy this business rule, a contact is designated as a viewable contact to the Third-Party user group, when the contact is created within the scope of a project.

The Project Administration group is able to delete a contact from a project, which removes the contact's information from the Project Unity database.

Project Issue

The PROJECT ISSUE object contains information pertaining to an issue that has been raised by a member of the project team.

Business Rules

The PROJECT ISSUE object is used to define an issue that a team member has found regarding the project. The PROJECT ISSUE object facilitates communication of project issues between project management and team members.

The main group of users who will be entering project issues into the system is the Project Team Member. The PROJECT ISSUE object is used to raise issues and concerns to the management of the project that require resolution for the successful outcome of the project. In actuality, all project team members, including users in the Project Administration group, have the ability to create a new project issue using an administration form on which the user enters a description of the issue. An issue number, the submit date, and the submitted by attribute are automatically populated with appropriate entries.

A project issue remains in a "Pending" status until a user, from the Project Administration group who has been given permissions to update issues, has the opportunity to review the issue and determine whether the issue is an acceptable entry. If the issue is deemed unworthy or otherwise unacceptable, the project administrator assigns the issue a "Declined" status, and the project issue is not assigned to a team member for resolution. If the issue is valid, the issue is placed in an "Active" status with the assignment of a responsible party, who is chosen from a list of team members, and a target completion date is set.

Upon resolution of the project issue, it is the responsibility of the project administrators to update the status of the issue to "Closed". If an "Active" issue has a target completion date that occurs in the past, the issue is considered "Overdue" and is denoted as such when the "Active" issues are listed for display. However, the status of the issue is not changed from "Active".

The list of project issues can be viewed using the Project Unity application by selecting Project Issues on the project home page. By default, the list of issues will display all of the "Active" issues sorted by target completion date in ascending order, i.e., the issues with the oldest target completion date are listed at the top of the list. If there are any "Overdue" issues, these are located at the top of the list. The list shows an issue's status, submit date, issue number, description, target completion date, and responsible party. The line item utilizes a red font if the issue is "Overdue", and utilizes a blue font if the target completion date is equal to today's date. The user selects the issue number in the issue list for a display of the full issue detail.

The list view is altered by allowing the issue data to be filtered and sorted in multiple ways. First, a user can view just the issues in a certain status, i.e. Active Issues, Declined Issues, Closed Issues, Pending Issues. A user can also view all of the issues or issues for which they have been designated as the responsible party. As well, the issue list can be sorted by any of the columns shown in the list with the application of any of the filters listed above.

The viewing of the project issues is limited, using security permissions, to members of the project team including members of the Project Administration group. A project issue cannot be deleted from the system, but the same effect can be performed by moving an incorrectly entered "Pending" issue to a "Declined" status. Because deletion is actually an editing of the project issue status, the members of the Project Administration group are the only users capable of "deleting" an issue.

Project Issues are key components to the project management service being offered in the Project Unity application. With the status transitions and editing involved in the management of the project issues, it is useful to maintain a history of the changes that occur to an issue throughout its life. It will be important to maintain a historical record of the changes made to an issue, the user who made the change, and the date the change occurred. There is no need, for the initial phase of the application development effort, to display the history of a particular issue. However, if the history is not maintained in the initial release, historical information will be lost and not recoverable.

News Article

The NEWS ARTICLE object contains information about a news article that is to be published for the benefit of the project team.

Business Rules

The NEWS ARTICLE object is an object used to define an item of news as a means of disseminating information to members of the project team. News articles are displayed in the Project Unity application in two different formats. The first format displays a single news article on the project home page in a scrolling box, which shows the article's title followed by the full text of the news item. The second format displays all of the news articles in a list.

A news article is created by a member of the Super User group or a member of the Project Administration group who has been given permission to perform site administration duties. The news article is automatically associated with the project in which the user chose upon entering the application. The user creating the article is responsible for populating the attributes of the NEWS ARTICLE object, which simply means providing a title and entering the textual body of the article.

The first display format is a single news article shown within a scrolling box on the project home page. By default, the newest article added to the set of project news articles is displayed on the project home page. The article displays a "New" tag for a set number of days after its creation that denotes the recent addition of the news item to the application. In a further embodiment, a particular news item is displayed on the project home page for only a set period of time. After the time period has expired, the display format reverts to its default behavior by displaying the most recently added news article.

The second format is a list that displays the creation date of the article, the title, and the body of the article. The list is sorted in descending order of creation date, i.e., the newest articles appear at the top of the list. The "New" tag will also be displayed for a set number of days to signify the novelty of the news item.

All members of the Project Team and the Third-Party users group are able to see all of the news articles associated with a project.

A news article can only be edited or deleted by select members of the Project Administration group who have been given site administration rights, and can access the administration forms of the NEWS ARTICLE objects.

Safety Tip

The SAFETY TIP object contains information about a project safety tip that is to be published for the benefit of the project team.

Business Rules

The SAFETY TIP object is an object used to define a safety message for disseminating information to members of the project team. Safety tips are displayed in the Project Unity application in two different formats. The first format displays a single highlighted safety tip on the project home page in a sidebar, and the second format displays all of the safety tips in a list.

A safety tip is created by a member of the Super User group or a member of the Project Administration group who has been given permission to perform site administration duties. The safety tip being entered is automatically associated with the project in which the user chose upon login to the application. The user creating the safety tip is responsible for populating the attributes of the object, i.e., entering the textual body of the message.

The first display format displays a single tip that is shown inside the sidebar area on the project home page. By default, the safety message displayed on the project home page is randomly chosen from the entire set of tips in the database. Every time the user refreshes the project home page or returns to the home page through normal navigation through the web site, the safety tip is randomly selected and displayed on the page. All tips that have been recently added to the system display a "New" designation on the home page for a set number of days after its creation. In a further embodiment, a particular safety tip is displayed on the home page for only a set period of time. After the time period has expired, the display format reverts to its default behavior.

The second format for viewing the news items is a list that displays the creation date of the safety message and the body of the message. The list is sorted in descending order of creation date, so the newest tip appears at the top of the list. The "New" tag is also displayed for a set number of days to signify the novelty of the message.

Since safety tips are displayed on the project home page which is seen by every user, the ability to view the list of project safety messages is available to all application users. All members of the Project Team and the Third-Party users group, as well as the Super User and Project Administration groups, are enabled to see all of the news articles associated with a project.

A safety tip can only be edited or deleted by select members of the Project Administration group who have been given site administration rights, and can access the administration forms of the SAFETY TIP objects.

Preferred Vendor

The PREFERRED VENDOR object contains information about project vendors that have been deemed by the project administrators as preferred vendors.

Business Rules

The PREFERRED VENDOR object is an object used to maintain a set of preferred vendors associated with a project. In terms of the business object model for the Project Unity application, the PREFERRED VENDOR object is an independent object with no direct association with the TEAM MEMBER object or the CONTACT object. As well, preferred vendor information is not sharable across multiple projects managed by the same client, as with team members. Preferred vendor information is entered into the system by the project administrators of each project.

The creation of a preferred vendor can be performed by a member of the Super User group or a member of the Project Administration group who has been granted permission to add/edit PREFERRED VENDOR objects. The preferred vendor is automatically associated with the project the user selected when entering the application. The attributes of the PREFERRED VENDOR object are populated at the time of creation. These attributes can be edited by the Super User group or the Project Administration group through the site administration forms available in the application.

The preferred vendor list displays a list of preferred vendors associated with the current project. The list displays the vendor's company name, name of a contact at the vendor, business phone number, business fax number, and a notes field for keeping additional information in a free form field. A user selects a vendor in the list to view detailed information about the vendor, including the business address.

The population of the preferred vendor list is based on the security rights given to the user. The members of the Super User group, the Project Administration group, and the Project Team group are granted rights to see the entire contact list. However, the Third-Party group is prevented from seeing individual vendors in the preferred vendor list. To satisfy this business rule, a vendor is designated as viewable to the Third-Party user group when the vendor is created within the scope of a project.

The Project Administration group is able to delete a vendor from a project, which removes the vendor's information from the Project Unity database.

Procurement

The PROCUREMENT object contains information, from an external data source, about the procurements made for a given project.

Business Rules

Procurement is a subset of Project Administration, which includes project financials, procurement, time sheet entry, and site administration. Procurement creates a summary report of the procurements made over the course of a project. The summary report lists, in table fashion, the individual procurements made by a project and imported into the database.

Information to populate the procurement summary report is entered into the Project Unity database through an import process from an external system. Updates to the information already loaded into the Project Unity database are also imported through a custom import process that falls outside of the scope of this document.

In one embodiment, the database is a read-only data source for the project procurement information and the system does not authorize anyone to delete or otherwise manually edit a procurement in the Project Unity database.

Viewing the summary report is a privilege defined by the user's security permissions. Viewing is provided to any user, who has been given the project-level security right to view the procurement summary report. When a user is associated with a project team to become a Team Member, the project manager specifies whether the user is allowed to see the procurement summary report.

Invoice

The INVOICE object contains information, from an external data source, about the invoices that have been received for a given project.

Business Rules

Invoices are a subset of Project Administration, which includes project financials, procurement, time sheet entry, and site administration. The Invoice functionality creates a summary report of the invoices issued over the course of a project. The summary report lists, in table fashion, each of the invoices issued on a project and imported into the database. The summary report displays total and grand total aggregation amounts to complete the report.

Information to populate the invoice summary report is entered into the Project Unity database through an import process from an external system. Updates to the information already loaded into the Project Unity database are also imported through a custom import process.

In addition, no one is allowed to delete or otherwise manually edit an invoice in the Project Unity database. The database is a read-only data source for the project invoices.

Viewing the summary report is a privilege defined by the user's security permissions. This functionality is provided to any user, who has been given the project-level security right to view the invoice report. When a user is associated with a project team to become a Team Member, the project manager specifies whether the user is allowed to see the invoice report.

Cost

The COST object contains information, from an external data source, about the costs that have been incurred by a given project.

Business Rules

Cost is a subset of Project Administration. The Cost functionality creates a summary report of the costs incurred over the course of a project. The summary report lists, in table fashion, each of the costs imported into the database. The summary report also displays total and grand total aggregation amounts to complete the report.

Information to populate the cost summary report is entered into the Project Unity database through an import process from an external system. Updates to the information already loaded into the Project Unity database are imported through a custom import process.

In addition, users are not allowed to delete or otherwise manually edit a cost in the Project Unity database. The database is a read-only data source for these project costs.

Viewing the summary report is a privilege defined by the user's security permissions. This functionality is provided to any user, who has been given the project-level security right to view the cost summary. When a user is associated with a project team to become a Team Member, the project manager specifies whether the user is allowed to see the summary report.

Figure 16:
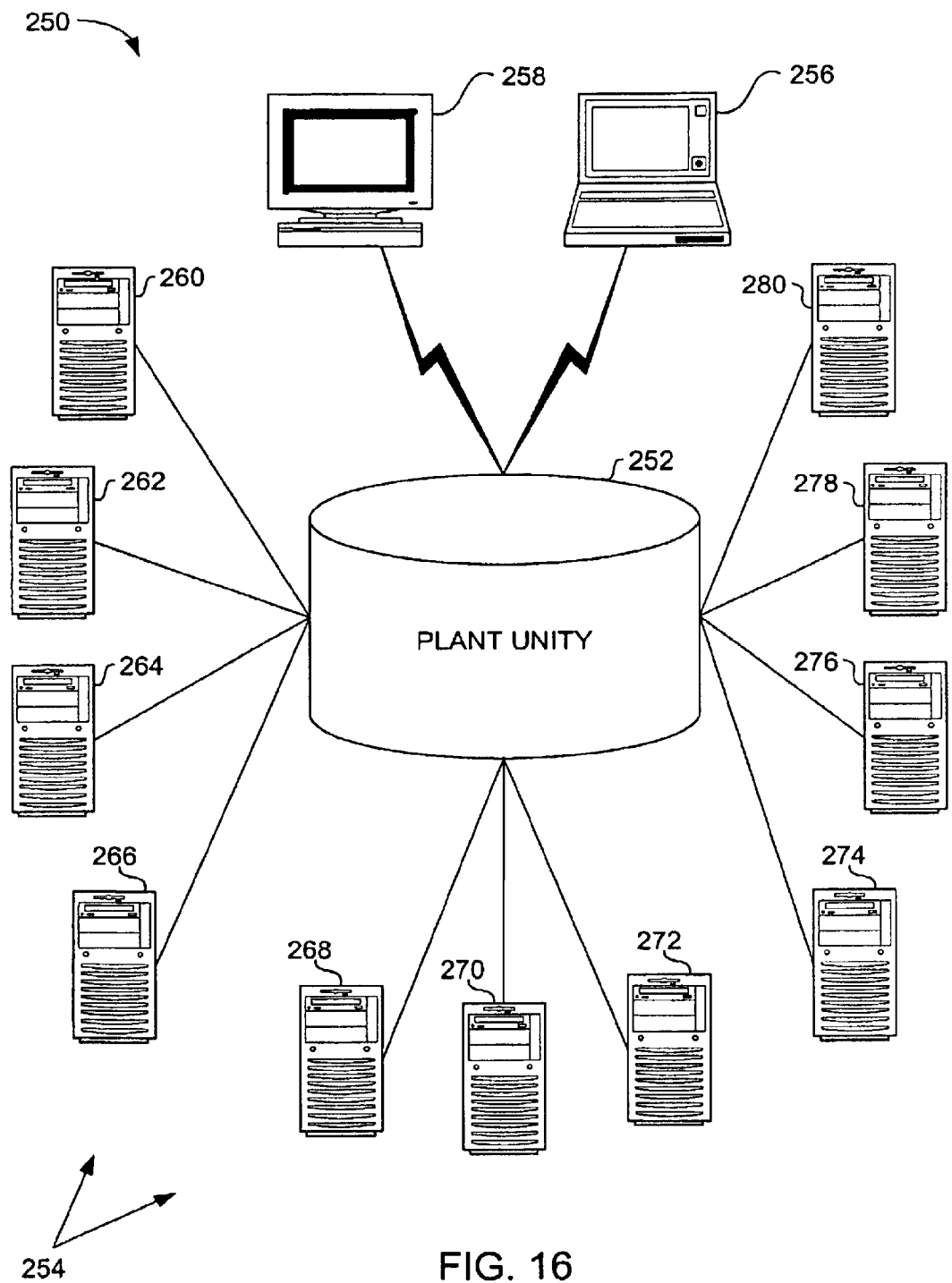
FIG. 16 is a system diagram of a network architecture in accordance with a further embodiment of the present invention.

FIG. 16 is a schematic diagram of a system 250, for example a Plant Unity system, including a Plant Unity server 252 connected to a plurality of devices 254. FIG. 16 illustrates an exemplary network architecture and how individuals on project teams or via the Internet can access components of Plant Unity. In one embodiment, devices 254 include a laptop computer 256 and a workstation 258. In addition, system 250 includes email 260, pager 262, TA Historian 264, HMI 266, Websites 268, Plant monitoring equipment 270, CAD files 272, inventory system 274, ERP system 276, Local databases 278, and PLC 280.

To access components of Plant Unity system 250, the user logs in, for example, on an engineering or manufacturer's network system. Security for Plant Unity system 250 utilizes existing network security as well as security from software packages utilized by system 250. For example, instrument database software such as INtools, ORACLE, OSI PI, Microsoft SQL Server, Sybase SQL or Microsoft Access database use internal logins to access instrument data. With the correct network access level, the user can view information and monitor the different systems and operations of the company from anywhere via the Internet.

Figure 17:
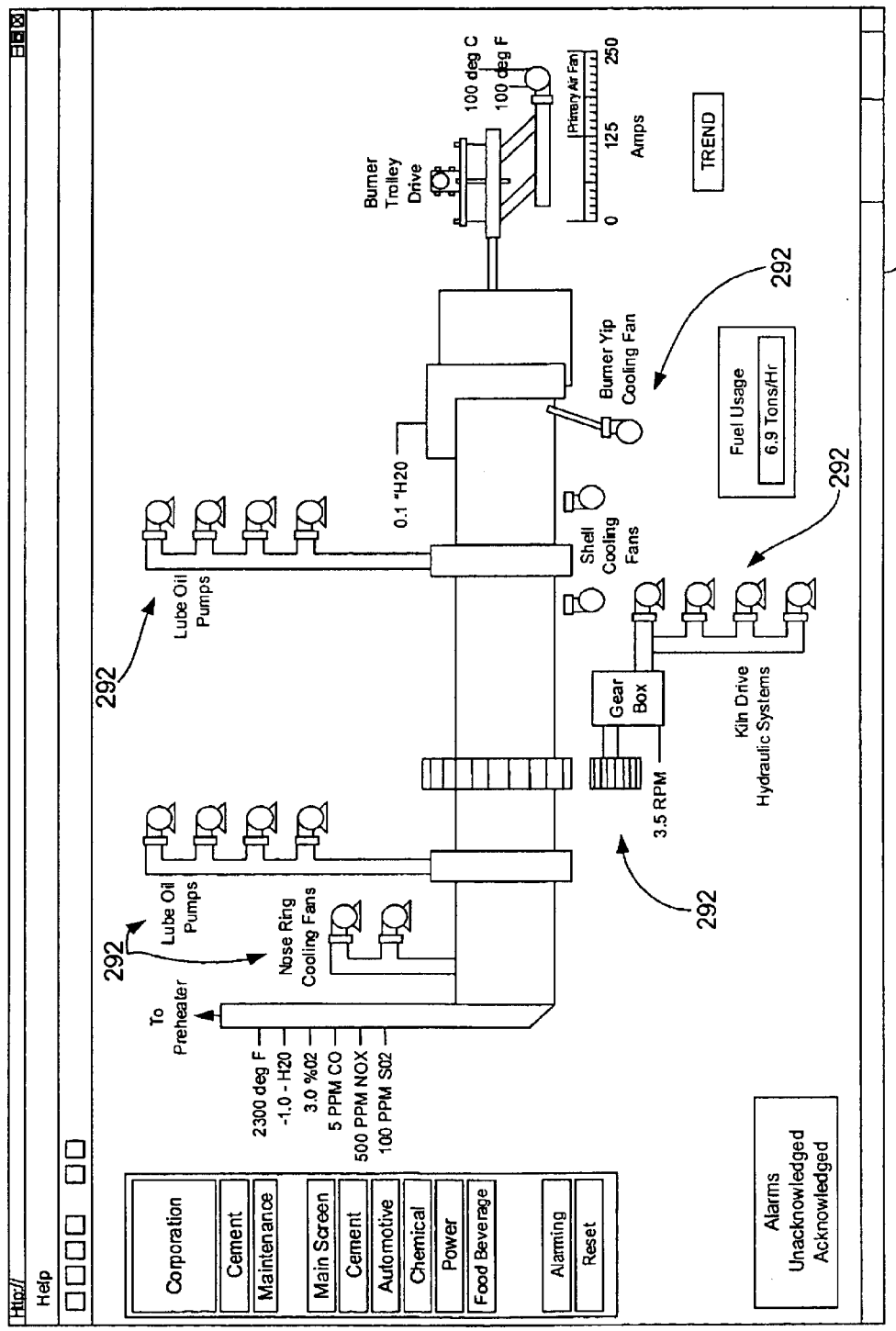
FIG. 17 is an exemplary graphic screen page.

Typically a manufacturing facility uses a graphic interface, such as a Human to Machine Interface (HMI) to monitor and control plant operations on workstation 258. FIG. 17 illustrates an exemplary graphic screen 290 for monitoring and controlling the operations of any plant process. A webviewer module within the HMI is utilized to enable other users such as plant managers and supervisors to view plant operations via the Internet. System 250 accepts information input by users, stores the information and transmits the information to an appropriate person once a suitable command is received. Screen 290 is utilized to gather information for controlling and monitoring production.

System 250 enables a user to view, on screen 290, a plurality of components 292 within the plant. The components include instruments, motors, fans, valve or buttons which provide access to another HMI screen. A component to be monitored or controlled is then selected by the viewer. By selecting a component, another graphic screen (not shown in FIG. 17), such as for controlling and monitoring the component, is opened.

The user accesses other data, through an individual graphic screen, from a variety of sources such as inventory 274, maintenance, data historian 264, websites 268, and others. Once the user completes the tasks for that particular component, the user closes that component graphic screen and is then returned to the previous graphic screen.

Screen 290 allows specific data access and can be setup to automatically monitor a specific component such as an instrument, pump, fan or motor. If the instrument fails or should have maintenance performed, system 250 automatically and without human intervention, pages specific individuals and e-mails work orders to individuals. The automatic paging and e-mailing reduces downtime and failures to issue work orders in a timely fashion.

Figure 18:
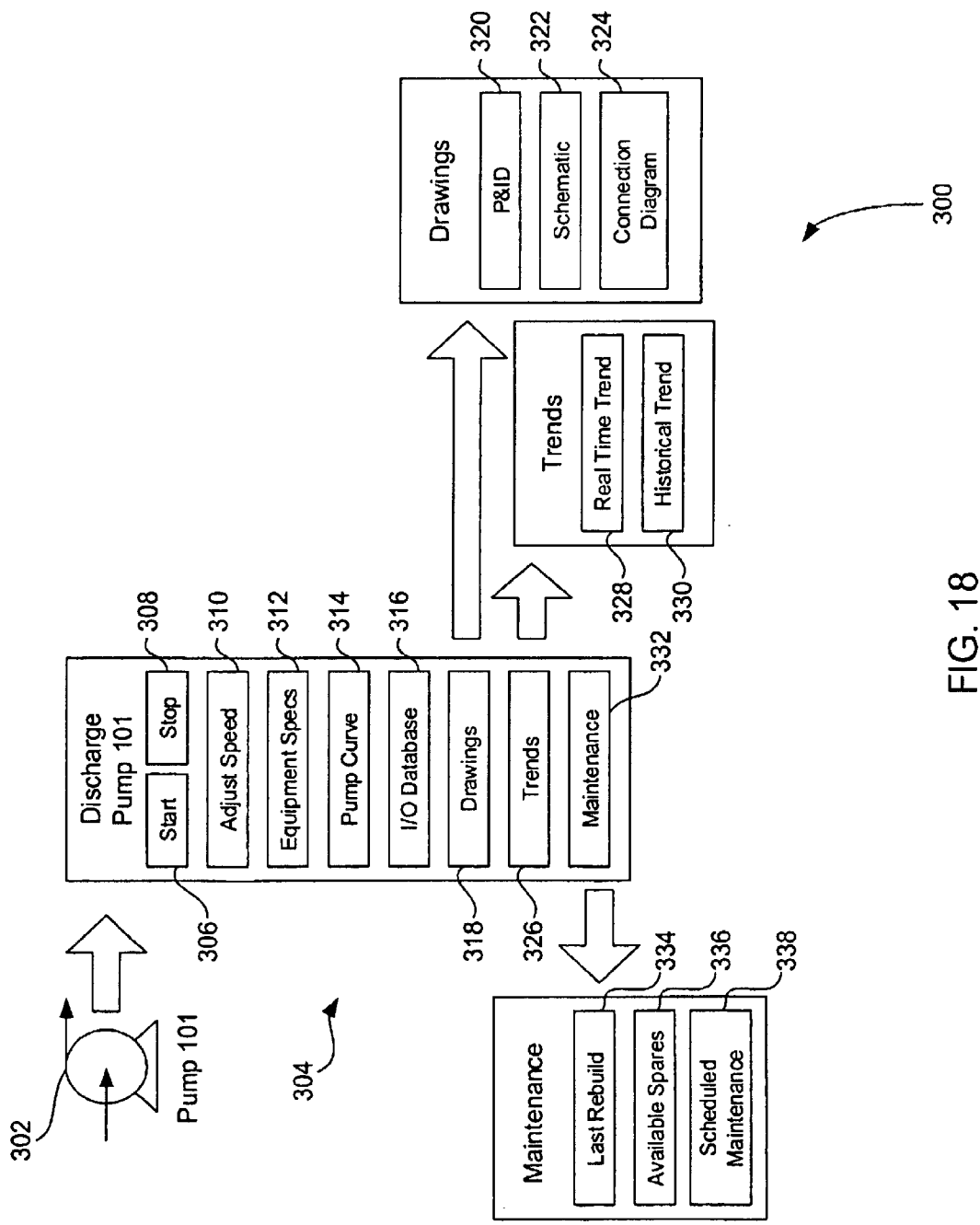
FIG. 18 is an exemplary graphic screen page.

Once a component is selected and the graphic controller screen is opened, the user is able to control the device and access information pertaining to that specific device. FIG. 18 is an exemplary graphic screen 300 for controlling and monitoring a pump 302. Screen 300 includes buttons 304 utilized to access information from other databases and servers on system 250. Specifically, buttons 304 include a START button 306, a STOP button 308, and an ADJUST SPEED button 310 which are utilized to control pump 302. In one embodiment, buttons 306, 308 and 310 are programmed using the general programming set of the HMI software program.

Screen 300 further includes an EQUIPMENT SPECS button 312 which incorporates a Visual Basic (VB) code. The VB code contains the database's computer node name, database user and password information to be granted permission to access the equipment specification sheet. The VB code then directs system 250 to provide an equipment specification sheet to the user. If the equipment specification sheet resides on the manufacturer's Internet website, the VB code includes the Internet website and specific webpage and launches the Internet webbrowser to view the equipment specification sheet. Likewise if the equipment specification sheet resides in a document file, the VB code includes the specific document and launches the document program executable to view the equipment specification sheet.

Screen 300 also includes a PUMP CURVE button 314 utilized to access a pump curve stored in database 278 (shown in FIG. 16). Button 314 also incorporates a VB code as described above.

An I/O DATABASE button 316 accesses an instrument and equipment database. In one embodiment, the I/O database resides in a database. Alternatively, the I/O database resides in a spreadsheet. The VB code includes the database's computer node name, database user and password information to be granted permission to access the instrument and equipment database. Likewise if the instrument and equipment database resides in a spreadsheet document file, the VB code includes the specific document and launches the document program executable to view the instrument and equipment database.

A DRAWINGS button 318 accesses another graphic screen which displays different drawings such as schematics, piping & instrument diagrams, or connection diagrams which are related to that specific piece of equipment. By selecting the specific drawing, the VB code includes the correct drawing filename, location of the file, and the CAD software executable filename and location of the file. The VB code opens the CAD software executable. Selection of drawing button 318 enables a P&ID button 320, a SCHEMATIC button 322, and a CONNECTION DIAGRAM button 324.

A TRENDS button 326 accesses another graphic screen which displays the different types of trends related to that specific piece of equipment. The VB code includes the trend name, file location, the trend software executable and file location to access the select trend. TRENDS button 326 can be created from data historian packages. Selection of TRENDS button 326 enables a REAL TIME TREND button 328 and a HISTORICAL TREND button 330.

A MAINTENANCE button 332 accesses another graphic screen which displays maintenance options and information related to that specific piece of equipment. MAINTENANCE button 332 is programmed using VB code to access the manufacturer's Internet website. The VB code includes the Internet website and specific webpage and launches the Internet webbrowser to view the manufacturer's information concerning pump 302. Selection of MAINTENANCE button 332 enables a LAST REBUILD button 334, an AVAILABLE SPARES buttons 336, and a SCHEDULED MAINTENANCE button 338.

Figure 19:
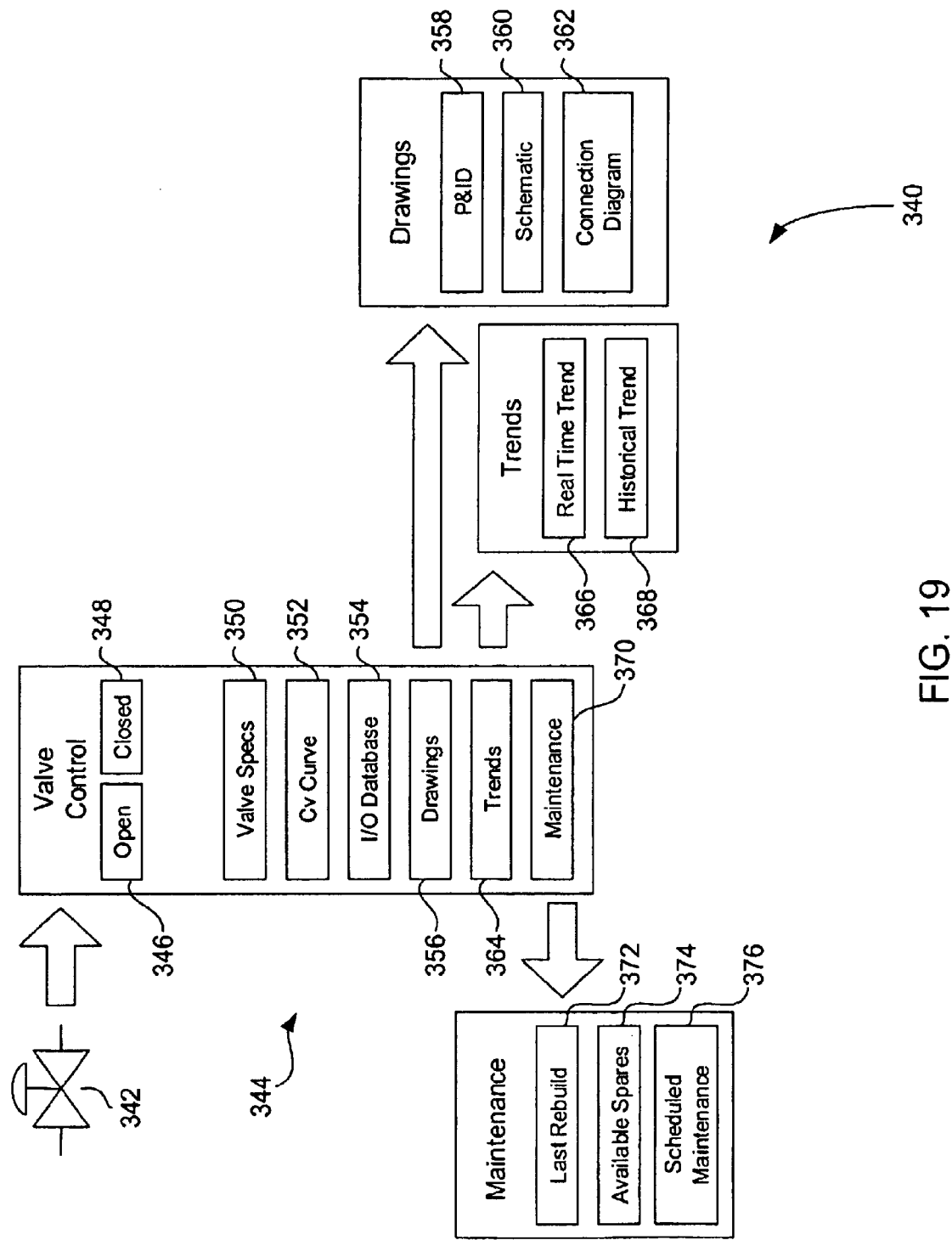
FIG. 19 is an exemplary graphic screen page for a Valve Graphic Controller.

FIG. 19 is an exemplary graphic screen page 340 for a Valve Graphic Controller 342. Controller page 340 includes buttons 344 utilized to access information from other databases and servers on system 250. Specifically, buttons 344 include an OPEN button 346 and a CLOSED button 348 which are utilized to control controller 342. In one embodiment, buttons 346 and 348 are programmed using the general programming set of the HMI software program.

Controller page 340 further includes a VALVE SPECS button 350 which incorporates a Visual Basic (VB) code.

The VB code contains the database's computer node name, database user and password information to be granted permission to access the equipment specification sheet. The VB code then directs system 250 to provide a valve specification sheet to the user. If the valve specification sheet resides on the manufacturer's Internet website, the VB code includes the Internet website and specific webpage and launches the Internet webbrowser to view the valve specification sheet. Likewise if the valve specification sheet resides in a document file, the VB code includes the specific document and launches the document program executable to view the valve specification sheet.

Screen 340 also includes a Cv CURVE button 352 utilized to access a controller valve curve stored in database 278 (shown in FIG. 16). Button 352 also incorporates a VB code as described above.

An I/O DATABASE button 354 accesses an instrument and equipment database. In one embodiment, the I/O database resides in a database. Alternatively, the I/O database resides in a spreadsheet. The VB code includes the database's computer node name, database user and password information to be granted permission to access the instrument and equipment database. Likewise if the instrument and equipment database resides in a spreadsheet document file, the VB code includes the specific document and launches the document program executable to view the instrument and equipment database.

A DRAWINGS button 356 accesses another graphic screen which displays different drawings such as schematics, piping & instrument diagrams, or connection diagrams which are related to that specific piece of equipment. By selecting the specific drawing, the VB code includes the correct drawing filename, location of the file, and the CAD software executable filename and location of the file.

The VB code opens the CAD software executable. Selection of drawing button 356 enables a P&ID button 358, a SCHEMATIC button 360, and a CONNECTION DIAGRAM button 362.

A TRENDS button 364 accesses another graphic screen which displays the different types of trends related to that specific piece of equipment. The VB code includes the trend name, file location, the trend software executable and file location to access the select trend. TRENDS button 364 can be created from data historian packages. Selection of TRENDS button 364 enables a REAL TIME TREND button 366 and a HISTORICAL TREND button 368.

A MAINTENANCE button 370 accesses another graphic screen which displays maintenance options and information related to that specific piece of equipment. MAINTENANCE button 370 is programmed using VB code to access the manufacturer's Internet website. The VB code includes the Internet website and specific webpage and launches the Internet webbrowser to view the manufacturer's information concerning controller 342. Selection of MAINTENANCE button 370 enables a LAST REBUILD button 372, an AVAILABLE SPARES buttons 374, and a SCHEDULED MAINTENANCE button 376.

Figure 20:
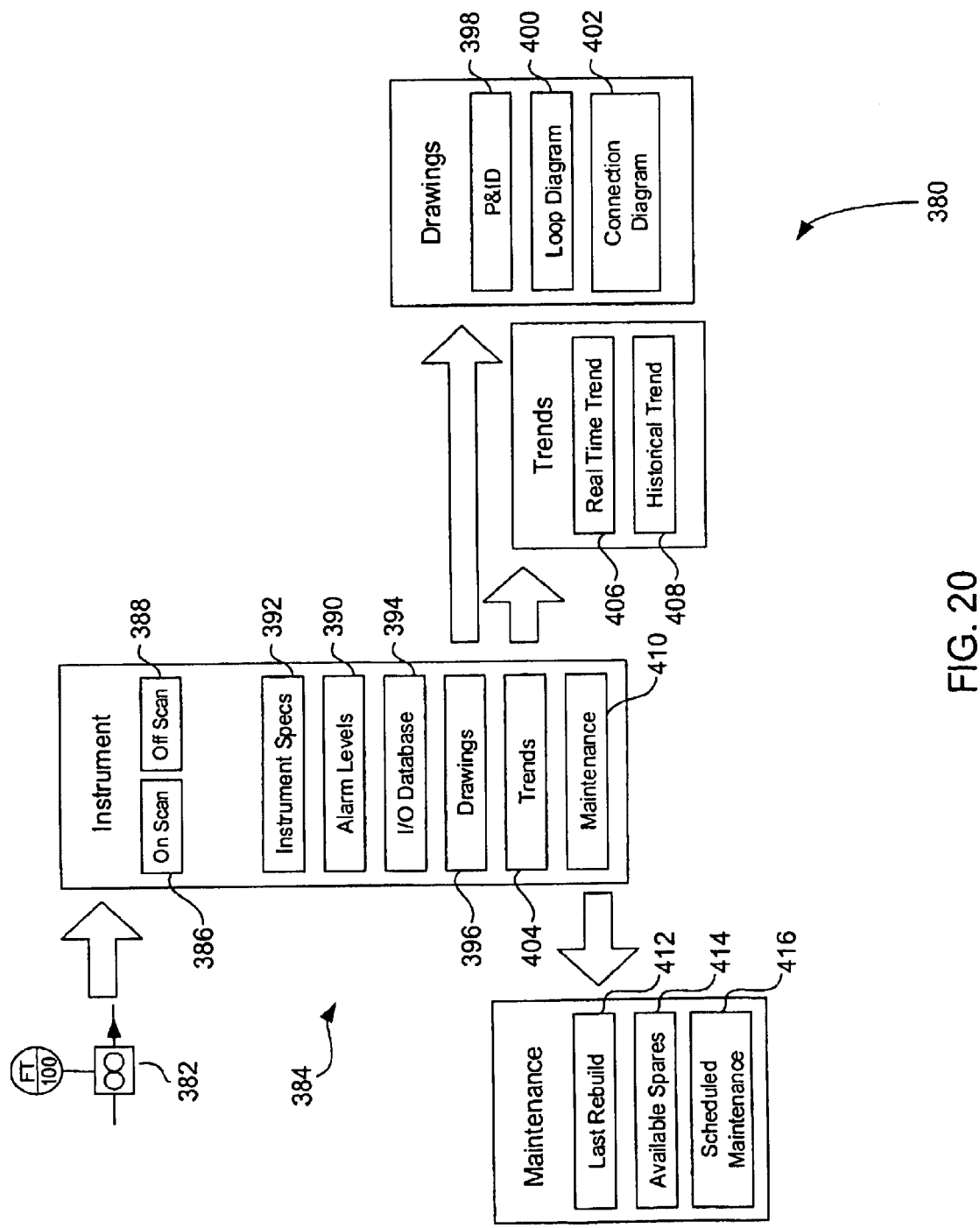
FIG. 20 is an exemplary graphic screen page for an Instrument Graphic Controller.

FIG. 20 is an exemplary graphic screen page 380 for an Instrument Graphic Controller 382. Controller page 380 includes buttons 384 utilized to access information from other databases and servers on system 250. Specifically, buttons 384 include an ON SCAN button 386, an OFF SCAN button 388, and an ALARM LEVELS button 390 which are utilized to control Instrument Graphic Controller 382. In one embodiment, buttons 386, 388, and 390 are programmed using the general programming set of the HMI software program.

Instrument Graphic Controller page 380 further includes an INSTRUMENT SPECS button 392 which incorporates a Visual Basic (VB) code. The VB code contains the database's computer node name, database user and password information to be granted permission to access the instrument specification sheet. The VB code then directs system 250 to provide an instrument specification sheet to the user. If the instrument specification sheet resides on the manufacturer's Internet website, the VB code includes the Internet website and specific webpage and launches the Internet webbrowser to view the valve specification sheet. Likewise if the instrument specification sheet resides in a document file, the VB code includes the specific document and launches the document program executable to view the instrument specification sheet.

An I/O DATABASE button 394 accesses an instrument and equipment database. In one embodiment, the I/O database resides in a database. Alternatively, the I/O database resides in a spreadsheet. The VB code includes the database's computer node name, database user and password information to be granted permission to access the instrument and equipment database. Likewise if the instrument and equipment database resides in a spreadsheet document file, the VB code includes the specific document and launches the document program executable to view the instrument and equipment database.

A DRAWINGS button 396 accesses another graphic screen which displays different drawings such as schematics, piping & instrument diagrams, or connection diagrams which are related to that specific piece of equipment. By selecting the specific drawing, the VB code includes the correct drawing filename, location of the file, and the CAD software executable filename and location of the file. The VB code opens the CAD software executable. Selection of DRAWINGS button 396 enables a P&ID button 398, a LOOP DIAGRAM button 400, and a CONNECTION DIAGRAM button 402.

A TRENDS button 404 accesses another graphic screen which displays the different types of trends related to that specific piece of equipment. The VB code includes the trend name, file location, the trend software executable and file location to access the select trend. TRENDS button 404 can be created from data historian packages. Selection of TREND button 404 enables a REAL TIME TREND button 406 and a HISTORICAL TREND button 408.

A MAINTENANCE button 410 accesses another graphic screen which displays maintenance options and information related to that specific piece of equipment. MAINTENANCE button 410 is programmed using VB code to access the manufacturer's Internet website. The VB code includes the Internet website and specific webpage and launches the Internet webbrowser to view the manufacturer's information concerning controller 382. Selection of MAINTENANCE button 410 enables a LAST REBUILD button 412, an AVAILABLE SPARES buttons 414, and a SCHEDULED MAINTENANCE button 416.

In one embodiment, system 250 includes other buttons that are programmed using VB code to provide other information to the user such as Standard Operating Procedure (SOP), organization charts, phone lists, and others. The SOP, organizational charts and phone lists reside in a text document, word processor document, HTML, or database. The VB code includes the filename, file location, and the applicable document program to view the document.

System 250 and the controllers controlling and monitoring the process, such as controllers 382 and 342 will be monitoring the equipment for predictive failure, failure and scheduled maintenance. An example of predictive failure is the controllers monitoring the temperature of bearings. As the temperature of the motor bearings rise at a given rate, the controllers indicate to the operator the potential failure of the motor. A failure example includes the motor overloading a trip. An example of scheduled maintenance is a motor that needs lubrication after it runs for 1000 hours. In any of these cases and other cases like them, it is advisable to take action to reduce the likelihood of downtime. System 250 pages an appropriate person and e-mails personnel the appropriate work order to complete the job. In one embodiment, a paging system is tied to system 250 for the paging aspect of the system.

Regarding the paging of the appropriate personnel, the VB code monitors the status of alarms, potential failure indicators, and maintenance indicators. Once the VB code identifies a failure or maintenance alarm, it identifies the equipment in question, identifies the personnel responsible for the equipment, and sends a page command to the paging system which then pages the identified personnel.

A work order is e-mailed to the appropriate personnel since the VB code includes the routine to identify a failure or maintenance alarm, the equipment in question, the parts for a proper repair, and the personnel responsible for the equipment. The VB routine interrogates the inventory system via an ODBC link to order the necessary parts and creates the work order from a template work order document. The work order document is a text file or word processor document. The VB routine attaches the work order document to an e-mail, activates the e-mail system, and sends the e-mail to the appropriate personnel.

While the invention has been described in terms of various specific embodiments, those skilled in the art will recognize that the invention can be practiced with modification within the spirit and scope of the claims.

What is claimed is:

1. A method for system design of a plant using a web-based system including a server and at least one device connected to the server via a network, said method comprising the steps of:
   receiving application data from a user via the device;
   integrating the received data into a database;
   utilizing the integrated data to monitor design activities;
   collecting monitored design activity data;
   displaying the collected data through a web interface to a person; and
   red-lining a drawing over the network by executing a computer program, the drawing pertaining to the plant.

2. A method in accordance with claim 1 wherein said step of receiving application data comprises the step of receiving data related to the design of the plant.

3. A method in accordance with claim 1 wherein said step of receiving application data comprises the steps of:
   gathering engineering data and information from multiple phases of design project;
   utilizing the gathered data and information to make decisions regarding construction of the plant; and
   assessing needs and opportunities of the plant design to improve management of the plant construction project.

4. A method in accordance with claim 1 wherein said step of receiving application data comprises the step of receiving application data via a network.

5. A method in accordance with claim 4 wherein said step of receiving application data comprises the step of receiving application data via at least one of a WAN, a LAN, an intranet, and the Internet.

6. A method in accordance with claim 1 wherein said step of receiving application data comprises the steps of:
   receiving login information from the user;
   receiving a project selection from the user; and
   determining a functionality available to the user and information the user can view based on a user level permission provided to the user.

7. A method in accordance with claim 1 wherein said step of receiving application data comprises the step of receiving red-lined drawings from the user.

8. A method in accordance with claim 1 wherein said step of integrating the received data into a database comprises the step of storing project data on a server remote from the system.

9. A method in accordance with claim 1 further comprising the steps of:
   receiving a site administration command; and
   transmitting a site administration page to the user for selection of one of an edit news block, an edit safety message block, and edit project team block, and an edit contact block.

10. A method in accordance with claim 1 wherein said step of receiving application data from a user comprises the step of receiving application data from a team member.

11. A method in accordance with claim 1 further comprises the step of creating a team member by:
    creating an application user in the system; and
    assigning the team member to a project.

12. A method in accordance with claim 1 further comprising the step of displaying a list of design issues.

13. A method in accordance with claim 1 wherein said step of displaying the collected data comprises the step of limiting access to the collected data in accordance with permissions given to the user.

14. A method in accordance with claim 1 wherein said step of receiving application data comprises the step of receiving information pertaining to concept, scope, pre-engineering, detailed engineering, and construction of the plant.

15. A method in accordance with claim 1 further comprising the step of utilizing the information for designing the plant.

16. A method in accordance with claim 1 wherein said step of displaying the collected data comprises the step of displaying a project schedule, a phone list, an organizational chart, an executive summary, meeting minutes, and progress reports.

17. A method in accordance with claim 1 further comprising the step of enabling drawings, including redlined drawings, to be created.

18. A method in accordance with claim 1 wherein said red-lining a drawing pertaining to the plant includes red-lining the drawing by executing a Java program.

19. A system for design of a plant, said system comprising:
    a device; and
    a server connected to said device and configured to receive plant application information data from a user via said device, utilize the application information data to monitor design activities, collect monitored design activity data, and display information obtained from monitoring the design activities through a web interface to a user, and red-line a drawing pertaining to the plant when the drawing is viewed over a network.

20. A system in accordance with claim 19 wherein said server further configured to receive data related to the design of the plant during construction of the plant.

21. A system in accordance with claim 19 wherein said server further configured to integrate the received information into a database.

22. A system in accordance with claim 19 wherein said server further configured to track and provide notices regarding plant progress.

23. A system in accordance with claim 19 wherein said server further configured to:

gather engineering data and information from multiple phases of a project:

utilize the gathered data and information to make decisions regarding construction of the plant; and assess needs and opportunities of the plant design to improve management of the plant construction project.

24. A system in accordance with claim 19 wherein said server further configured to:

receive login information from the user;

receive a project selection from the user; and determine a functionality available to the user and information the user can view based on a user level permission provided to the user.

25. A system in accordance with claim 19 wherein said server further configured to receive red-lined drawings from the user.

26. A system in accordance with claim 19 wherein said server further configured to store project data on a server remote from the system.

27. A system in accordance with claim 19 further configured to:

receive a site administration command; and transmit a site administration page to the user for selection of one of an edit news block, an edit safety message block, an edit project team block, and an edit contact block.

28. A system in accordance with claim 19 wherein said server further configured to receive application data from a team member.

29. A system in accordance with claim 19 wherein said server further configured to limit access to the collected data in accordance with permissions given to the user.

30. A system in accordance with claim 19 wherein said server further configured to receive information pertaining to concept, scope, pre-engineering, detailed engineering, and construction of the plant.

31. A system in accordance with claim 19 further configured to utilize information for designing the plant.

* * * * *

UNITED STATES PATENT AND TRADEMARK OFFICE
CERTIFICATE OF CORRECTION

PATENT NO. : 6,868,370 B1  Page 1 of 1
APPLICATION NO. : 09/574564
DATED : March 15, 2005
INVENTOR(S) : Burbridge et al.

It is certified that error appears in the above-identified patent and that said Letters Patent is hereby corrected as shown below:

In Claim 15, column 24, line 45, delete "the information" and insert therefor -- information --.

In Claim 19, column 24, line 65, delete "and display" and insert therefor -- display --.

In Claim 23, column 25, line 15, delete "project:" and insert therefor -- project; --.

Signed and Sealed this

Thirtieth Day of October, 2007

JON W. DUDAS
*Director of the United States Patent and Trademark Office*